United States Patent
da Silva et al.

(10) Patent No.: US 9,661,441 B2
(45) Date of Patent: May 23, 2017

(54) SYSTEM AND METHOD TO REDUCE RADIO RESOURCE MANAGEMENT (RRM) RELATED SIGNALING IN MACHINE-TO-MACHINE (M2M) COMMUNICATIONS

(71) Applicant: TELEFONAKTIEBOLAGET L M ERICSSON (PUBL), Stockholm (SE)

(72) Inventors: Icaro L. J. da Silva, Sollentuna (SE); Konstantinos Dimou, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 684 days.

(21) Appl. No.: 13/864,562

(22) Filed: Apr. 17, 2013

(65) Prior Publication Data

US 2014/0313908 A1    Oct. 23, 2014

(51) Int. Cl.
*H04W 24/10* (2009.01)
*H04W 72/04* (2009.01)
*H04W 4/00* (2009.01)

(52) U.S. Cl.
CPC ......... *H04W 4/005* (2013.01); *H04W 72/042* (2013.01); *Y02B 60/50* (2013.01)

(58) Field of Classification Search
None
See application file for complete search history.

(56) References Cited

U.S. PATENT DOCUMENTS

| 2007/0232341 | A1* | 10/2007 | Sakata | 455/509 |
| 2007/0254595 | A1* | 11/2007 | Yoon | H04L 5/0057 455/67.14 |
| 2007/0287476 | A1* | 12/2007 | Jeong | H04W 76/02 455/456.6 |
| 2009/0135787 | A1* | 5/2009 | Uemura et al. | 370/335 |

(Continued)

OTHER PUBLICATIONS

ETSI TS 136 212 V8.8.0; LTE; Evolved Universal Terrestrial Radio Access (E-UTRA); Multiplexing and channel coding (3GPP TS 36.212 version 8.8.0 Release 8); Jan. 2010.

(Continued)

*Primary Examiner* — Marcus R Smith
*Assistant Examiner* — Duc Duong

(57) ABSTRACT

System and method for reducing signaling overhead related to scheduling of uplink and downlink radio resources to wireless devices (e.g., sensors or Machine-to-Machine (M2M) devices) that are primarily stationary in a cellular network. Because these wireless devices are non-moving, time-frequency channel conditions have a much lower variance for them as compared to other mobile devices in the network. Hence, the (semi)stationary channel can be estimated over time with the help of statistical methods and machine learning techniques, and stationary devices can be then instructed to stop reporting uplink and/or downlink channel condition related information to the network until further notice. When performance degradation is noticed by the base station, the scheduler may instruct the device to resume its channel condition reporting. As a byproduct of this solution, the energy consumed within such stationary (Continued)

terminals is reduced due to significant reductions in the number of channel measurements, their processing, and reporting.

21 Claims, 10 Drawing Sheets

(56) References Cited

U.S. PATENT DOCUMENTS

| | | | |
|---|---|---|---|
| 2009/0143091 A1* | 6/2009 | Kim | H04W 52/146 455/522 |
| 2009/0163199 A1 | 6/2009 | Kazmi | |
| 2009/0290570 A1* | 11/2009 | Kishiyama et al. | 370/344 |
| 2010/0113057 A1* | 5/2010 | Englund et al. | 455/452.1 |
| 2010/0167657 A1* | 7/2010 | Molnar | H04W 24/10 455/67.11 |
| 2010/0202306 A1* | 8/2010 | Jersenius et al. | 370/252 |
| 2011/0213871 A1 | 9/2011 | Digirolamo | |
| 2013/0229931 A1* | 9/2013 | Kim | H04W 24/10 370/252 |
| 2013/0315120 A1* | 11/2013 | Yu | H04W 52/0216 370/311 |
| 2013/0322276 A1* | 12/2013 | Pelletier et al. | 370/252 |
| 2013/0343252 A1* | 12/2013 | Chakraborty et al. | 370/311 |

OTHER PUBLICATIONS

Intel, et al; "MTC Low Mobility—Optimizing periodic LU/RAU/TAU signalling," 3GPP Draft; S2-101669, 3rd Generation Partnership Project; San Francisco, USA, Feb. 25, 2010.

* cited by examiner

FIG. 5
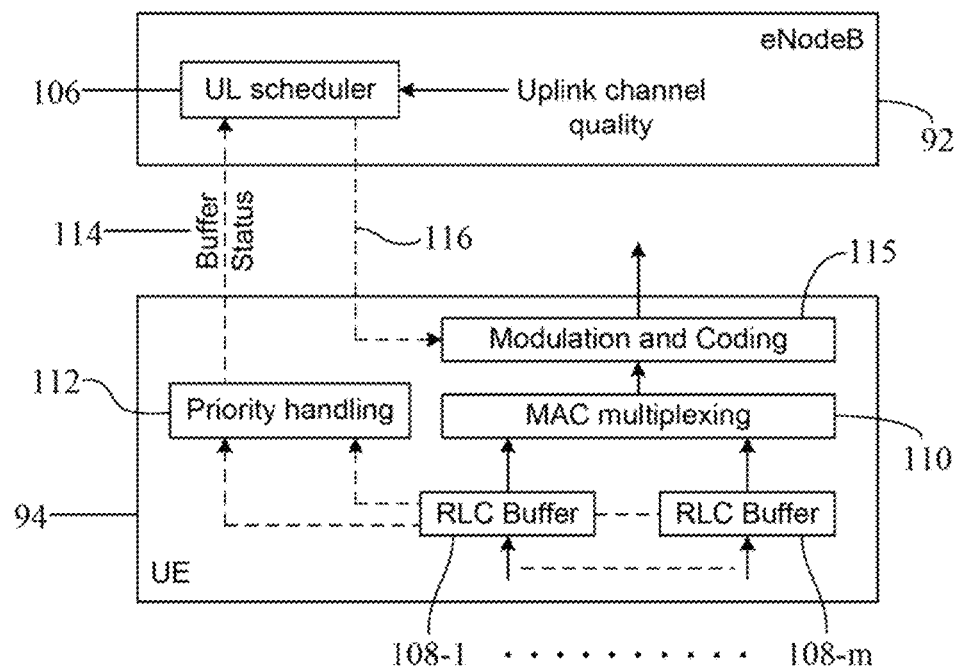
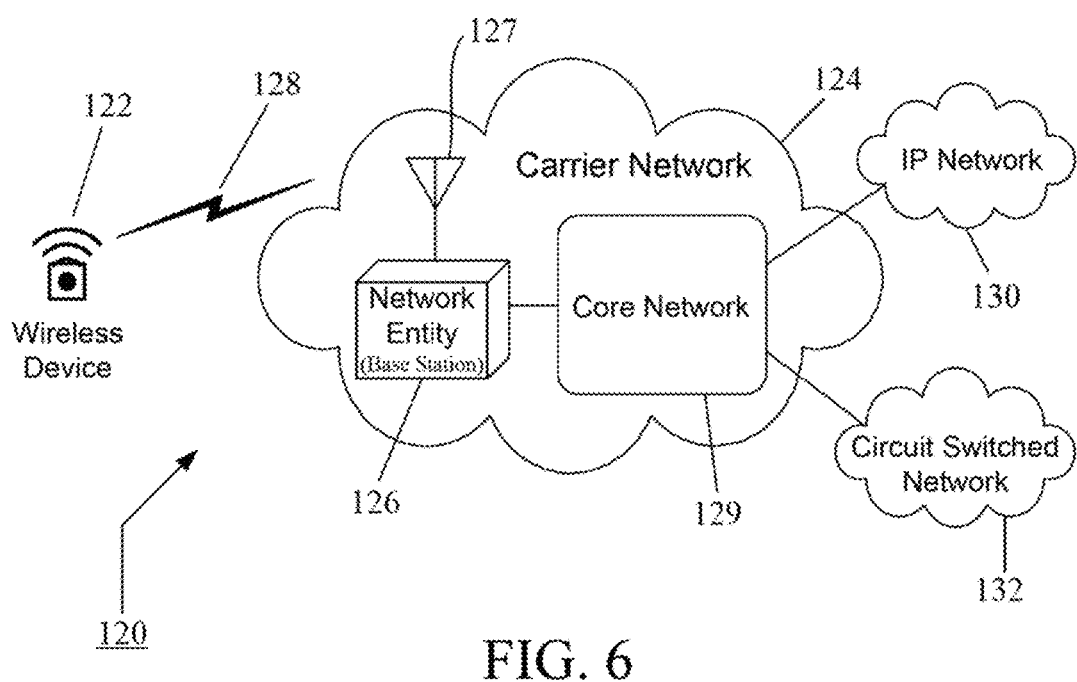
FIG. 6

FIG. 9
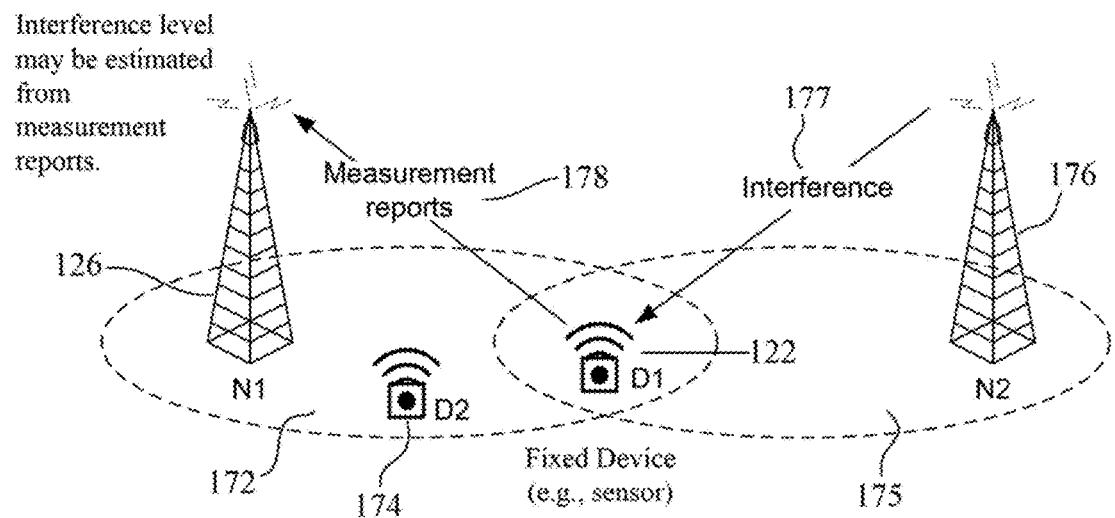
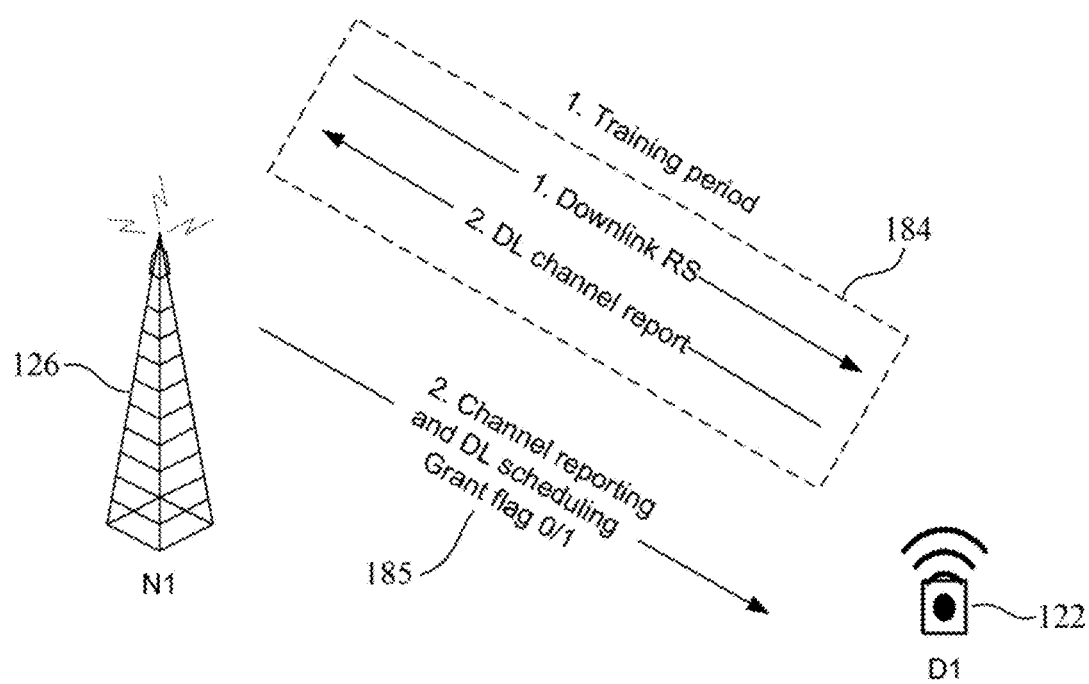
FIG. 10

| Physical Resource Block (PRB) # | 0 | 1 | 2 | 3 | 4 | ..... |
|---|---|---|---|---|---|---|
| DL Received Signal Strength (RSS) [dBm] | -110 | -100 | -108 | -107 | -103 | |
| DL SINR (≈ CQI) [dB] (Interference: Low) | 0 | 8 | 1 | 2 | 5 | |
| DL SINR Autocorrelation | 2 | 1 | e | 1 | 2 | .... |
| DL RSS Autocorrelation | e | 2 | 3 | e | 3 | |
| Scheduling Knowledge Available | 1 | 1 | 1 | 1 | 1 | |

188

New DCI Format 0A with
a flag bit
(1 = Report channel
condition related
information, 0 = Do not
report channel condition
related information)

PDCCH (from N1)

↓

D1

SYSTEM AND METHOD TO REDUCE RADIO RESOURCE MANAGEMENT (RRM) RELATED SIGNALING IN MACHINE-TO-MACHINE (M2M) COMMUNICATIONS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

TECHNICAL FIELD

The present disclosure relates to Radio Resource Management (RRM) in a mobile communication system. More particularly, and not by way of limitation, particular embodiments of the present disclosure are directed to a system and method to reduce signaling overhead related to scheduling of Uplink (UL) and Downlink (DL) radio resources to primarily stationary wireless devices such as, for example, Machine-to-Machine (M2M) devices performing M2M communications.

BACKGROUND

Machine-to-Machine (M2M) communications involve the communication (using wired or wireless means, or a combination of both) between two machines without human intervention. It is noted here that the term "M2M communication" is also referred to as "Machine Type Communication (MTC)" in certain literature. Hence, these terms may be used interchangeably in the discussion herein. Some examples of M2M communications are: smart metering (e.g., remote reading of a utility meter), healthcare monitoring (e.g., remote monitoring of a patient's heart rate), agricultural monitoring (e.g., monitoring of a crop condition), forest supervision (e.g., monitoring of illegal poaching or logging), fleet management tracking (e.g., monitoring current status of trucks on the road), security surveillance (e.g., automatic, real-time monitoring of a building or complex), billing transactions, inventory management (e.g., through monitoring of Point of Sale (POS) transactions in a supermarket), and the like. Many M2M devices are detection instruments with deployment over large geographical areas and relatively low access to power. The M2M communications typically use MTC-capable sensors or diagnostic devices (which may perform the metering, monitoring, etc., mentioned earlier) on one end and an M2M user device, receiver or server on the other end to receive data (e.g., wirelessly via a cellular Access Network (AN) as discussed below with reference to FIG. 1) from the sensor devices and process the data as per desired M2M service (e.g., utility metering service, healthcare monitoring service, billing preparation service, and the like).

M2M communications are expected to contribute heavily to connectivity and traffic within the mobile broadband industry. The GSM/EDGE system (where "GSM" refers to Global System for Mobile communications and "EDGE" refers to Enhanced Data Rate for GSM Evolution systems) already serves a rapidly expanding market for MTC. Mobile communications operators have expressed interest in accommodating traffic serving wireless sensors/devices within modern evolved networks, such as those based on Third Generation Partnership Project's (3GPP) Long Term Evolution (LTE). GSM/GPRS (where "GPRS" refers to General Packet Radio Service) are getting older and operators aim at totally replacing them with more modern networks. As part of this, it would also be incumbent on the operators to handle MTC traffic served by existing cellular networks (such as GSM/EDGE networks), and to also provide a transition for such traffic from, e.g., GPRS/EDGE to future versions of cellular systems such as International Mobile Telecommunications-Advanced (IMT-Advanced) systems (e.g., 3GPP LTE Advanced or LTE-A systems).

Wireless sensor networks have gained increasing interest from academia and industry. However, such networks have been predominantly built around short range communication links, such as those based on Bluetooth®, and, more recently, on the Zigbee® standard. Hence, it is of interest to examine whether existing and future cellular systems can be modified to efficiently accommodate the traffic from these wireless devices. This is a challenging task considering that: (1) The latest versions of existing cellular systems—e.g., 3GPP systems such as Wideband Code Division Multiple Access (WCDMA) based High Speed Packet Access (HSPA) systems, LTE or LTE-A systems, or systems based on Institute of Electrical and Electronics Engineers (IEEE) standards such as, for example, Worldwide Interoperability for Microwave Access (WiMAX) systems based on IEEE 802.16e and 802.16m, etc.—are conceived with the primary goal to provide service mainly to Mobile Broadband (MBB) users. (2) There is a requirement from operators that these wireless devices (such as sensors or M2M devices) have low cost and high energy efficiency.

Prior to proceeding further, it is noted here that, in the discussion below, the terms "wireless device", "MTC device," "M2M device," "M2M entity," "M2M communication entity," or other such terms of similar import may be used interchangeably for ease of discussion. It is understood that an "M2M device" is a device, sensor, or instrument that is capable of M2M communication in a wireless manner. Depending on a given context, the term "wireless device" may refer to an M2M Device (whether Direct Access or Indirect Access (discussed below)) or an M2M Gateway (GW) or both. However, if context dictates otherwise, a device and a gateway may be specified individually rather than through the common terms "MTC device" or "M2M Device." In certain embodiments, a "wireless device" may include a non-M2M device as well. Furthermore, it is noted here that an M2M communication entity or device may represent a User Equipment (UE) or a Mobile Station (MS) (also known by various analogous terms such as "mobile handset," "wireless handset," "wireless device," "terminal," etc.) properly configured for M2M communications. Some examples of such mobile handsets/devices include cellular telephones or data transfer equipments (e.g., a Personal Digital Assistant (PDA) or a pager), smartphones (e.g., iPhone™, Android™ phones, Blackberry™, etc.), handheld or laptop computers, Bluetooth® devices, electronic readers, portable electronic tablets, etc.

FIG. 1 illustrates an exemplary M2M communications system 10 using fixed and wireless (mobile) Access Networks (AN). The fixed access networks are identified by reference numerals "12" and "14", whereas the wireless mobile AN is identified by reference numeral "16." The wireless mobile AN 16 may be a 3GPP cellular AN or an International Mobile Telecommunication (IMT) Radio Access Network (RAN) such as, for example, a Universal Terrestrial Radio Access Network (UTRAN), an Evolved-UTRAN (E-UTRAN), a GSM/EDGE RAN (GERAN), a WiMAX network, and the like. Various M2M devices are identified using reference numerals "18" through "30." As shown by broken bi-directional arrows 32-34 (in dash-dot format "- • - • -"), all of these access networks 12, 14, 16 eventually connect their respective M2M devices 18-30 to an Internet-based service network 36 that may host an M2M server 38 from an M2M Service Provider (SP). The server 38 may remotely control or "operate" the M2M devices 18-30 as well as receive and process data sent by these devices. For example, if an M2M communication entity is a building surveillance sensor or unit, the M2M server 38 in that case may be a remote data collection/processing unit that may instruct the surveillance sensor to transmit surveillance data thereto at predefined time intervals (so as, for example, not to overload cellular network resources). It may be possible that the M2M service provider is also the operator or provider of the cellular and/or fixed access networks. On the other hand, the M2M SP may be independent of the cellular or fixed AN operator, but may have a business relationship with these network operators for interoperability purposes. Similarly, the fixed networks 12, 14 and the mobile network 16 may be owned and/or operated by different service providers/operators or the same service provider/operator.

The fixed access networks 12, 14 may be broadband networks that provide Internet Protocol (IP) connectivity to their respective wireless devices 18-21 and 28-30 using a non-cellular access, which is indicated by dashed ("- - - -") bi-directional arrows 41-43 and 45-47. On the other hand, because of advances in fixed-mobile convergence, a fixed access network may provide IP connectivity via a cellular access as well. In FIG. 1, all 3GPP cellular accesses are shown by dotted ("......") bi-directional arrows 50-54. Thus, in case of fixed AN 14, the wireless device 27 may communicate with and through the network 14 via a 3GPP Home Evolved Node-B (HeNB) or Home Node B (HNB) 56 as indicated by the arrow 54 depicting such 3GPP cellular access.

Referring again to fixed networks 12, 14, it is observed here that some of the M2M communication entities 19-21 and 28-30 may be interconnected with one another, with other similar entities (not shown), or with one or more M2M Gateways (e.g., the M2M Gateways (GW) 21 and 30) via "local" M2M area networks 60, 62, which could be IEEE 802.15.1, Bluetooth®, or other similar Wireless Local Area Networks (WLAN) (e.g., a WiFi network). It is noted here that a wireless device may be a Direct Access M2M device (e.g., devices 22-23 and 27) that supports direct access to an access network, or an Indirect Access M2M device (e.g., devices 18-20, 24-25, and 28-29) that does not support direct access to an access network. An M2M gateway (e.g., gateways 21, 26, and 30) may be used to support network access for such Indirect Access M2M devices. The M2M Gateway may function as a concentrator of data received from various such Indirect Access M2M devices communicating therewith. A dedicated Gateway (GW) 64 (which may or may not be and M2M gateway—i.e., which may not be capable of supporting M2M communications) may provide access to an IP network (e.g., the Internet based service network 36) for the M2M device 18 through the fixed network 12.

It is noted here that, in FIG. 1, signaling between a network node and a fixed access network (e.g., between an M2M GW 21 and the fixed AN 12, between the HeNB 56 and the fixed AN 14, etc.) and signaling beyond access networks (whether fixed or wireless) are indicated using unbroken bi-directional arrows 66-72 for ease of illustration and to distinguish initial access-related signaling shown by arrows 40-43, 45-47, 52-54, etc.

The wireless devices 22-23 may directly access 3GPP cellular wireless AN 16 via a base station (e.g., the base station 75) or through the combination of a Relay Node (RN) 76 and the base station 75. On the other hand, the wireless devices 24-25 may indirectly access the network 16 through an M2M GW 26 that communicates with the AN 16 via another base station 78. As in case of wireless devices 19-21 and 28-30, the wireless devices 24-26 also may be interconnected with one another via a "local" M2M area network 80 supporting non-cellular signaling (as indicated by dashed bi-directional arrows 82-84). The wireless AN 16 may further support inter-domain communication between two or more devices (operating under different base stations) without the involvement of the M2M service provider's server 38, as shown by the exemplary bi-directional arrow 86 (also in the dash-dot format "- • - • -").

In case of cellular access, the term "access network" may include not only a RAN portion (comprising, for example, a base station with or without a base station controller) of a cellular carrier network, but other portions (e.g., cellular backhaul and core network) as well. In FIG. 1, an exemplary IMT Core Network (CN) is shown using reference numeral "88." As shown in FIG. 1, the cellular AN 16 may include multiple cell sites 89-90, each under the radio coverage of a respective base station (BS) or base transceiver station (BTS) 75, 78. The base stations 75, 78 may be, for example, eNodeBs (or eNBs), high power and macro-cell base stations or relay nodes, etc. These base stations 75, 78 may receive wireless communication (as indicated by exemplary bi-directional arrows 52-53) from various M2M communication entities 22-26, and forward the received communication to the Core Network 88. In case of a Third Generation (3G) RAN, for example, the cellular backhaul (not shown) may include functionalities of a 3G Radio Network Controller (RNC) or Base Station Controller (BSC). As mentioned earlier, portions of the backhaul (such as, for example, BSC's or RNC's) together with base stations 75, 78 may be considered to comprise the RAN portion of the network. The Core Network (CN) 88, on the other hand, may provide logical, service, and control functions (e.g., subscriber account management, billing, subscriber mobility management, etc.), Internet Protocol (IP) connectivity and interconnection to other networks (e.g., the Internet or the Internet-based service network 36) or entities, roaming support, etc. The CN 88 may be, for example, an IMT CN such as a 3GPP CN or a 3GPP2 CN (for Code Division Multiple Access (CDMA) based cellular systems), or an ETSI TISPAN (European Telecommunications Standards Institute TIPHON (Telecommunications and Internet Protocol Harmonization over Networks) and SPAN (Services and Protocols for Advanced Networks)) CN.

From the above discussion, it is seen that the system 10 in FIG. 1 allows M2M communications among two or more M2M devices/sensors 18-30 via respective networks (fixed or wireless), and also between one or more of these devices and their respective networks. Because the present disclosure is related to radio resource management in a wireless network (primarily a mobile communication system), the discussion below will not further discuss signaling or resource conservation aspects in the context of a fixed network.

Signaling mechanisms in existing and future 3GPP and IEEE wireless networks have been conceived with the intention of securing a robust connection or session lasting for long periods of time and involving transmission of large volumes of data. In this respect, signaling mechanisms and protocols involving several long messages amounting to hundreds or thousands of kilobytes of data are not considered as particularly significantly overhead, especially when compared with the large amount of data traffic (in mega- and giga-bytes of data) exchanged within a session. In other words, current and future cellular and IEEE networks treat protocol-related signaling (including UL and DL radio resource scheduling related signaling discussed below) as a relatively "minor" traffic when compared to the significantly larger payload data.

On the other hand, in the most common scenario, the M2M devices 22-27 shown in FIG. 1 are anticipated to transmit—in each uplink transmission—only a single packet containing measurements or warnings, or any other type of information to the cellular network (or respective base station). In case of wireless devices used in M2M communication, data transmissions occur mainly in the uplink (i.e., from the device to the network), whereas the downlink (from the network to the device) serves mainly for transmitting feedback and link control information to devices. Thus, terminals operating in a wireless network may exchange information (which includes data, scheduling and control information, feedback information, etc.) via a base station in the network over a communication channel or link (e.g., a Radio Frequency (RF) channel) (conveniently referred to herein as the "channel") between the base station and the wireless terminals.

Channel-Dependent Scheduling

A "scheduler" is used in a wireless network (e.g., as part of a base station in a cellular network such as a 3GPP LTE network) to determine to/from which terminal(s) to transmit/receive data and on which set of radio resource(s) in the different domains (time, frequency, etc.) of the communication system. A scheduler is a key element of the network and, to a large extent, determines the overall behavior of the system.

In a situation where the channel quality varies significantly with the frequency while the channel quality only varies slowly with time, channel dependent scheduling in the frequency domain can enhance system capacity. This is typically the case in wideband indoor systems with low mobility, a scenario which is very likely to be the case in some M2M deployments.

To select a suitable data rate (in practice, a suitable modulation scheme and channel coding rate), as well as suitable power (transmitted or received) for the channel-dependent scheduling, the transmitter needs information about the radio-link channel conditions.

FIG. 2 illustrates general principles of channel-dependent scheduling in the downlink. Steps 1 through 3 in FIG. 2 depict how Downlink (DL) channel status is reported. For the downlink, most systems provide a downlink signal of a predetermined structure, known as the downlink pilot or the DL Reference Signal (RS). This reference signal is transmitted (step 1 in FIG. 2) from a base station (e.g., the base station 92 in FIG. 2) with a constant power and can be used by a mobile terminal (e.g., the terminal 94 in FIG. 2) to estimate the instantaneous downlink conditions (step 2 in FIG. 2), which can then be reported to the base station (step 3 in FIG. 2). The mobile terminal 94 can be an M2M device or a UE or other mobile handset that is capable of M2M communication. What is relevant for the transmitter (i.e., the base station 92) is an estimate reflecting the channel conditions at the time of the transmission. Thus, the more rapid the time-domain channel variations are, the less efficient link adaptation is. Because there inevitably will be a delay between the point in time when the terminal measures the channel conditions and the application of the reported value in the transmitter, channel-dependent scheduling and link adaptation typically operates at its best at low terminal mobility.

FIG. 3 illustrates general principles of channel-dependent scheduling in the uplink. Steps 1 through 3 in FIG. 3 depict how Uplink (UL) channel status is determined. For the uplink, estimation of the uplink channel conditions is not as straightforward, as it will be described later in the case of LTE systems. In order for an uplink scheduler in an eNodeB to determine uplink channel quality, the UE 94 must send Sounding Reference Signals (SRS) as input to the base station or eNodeB 92 (step 1 in FIG. 3). The base station 92 (and, more specifically, the scheduler in the base station) may estimate UL channel quality from the SRS signal (step 2 in FIG. 3) and then allocate appropriate radio resources to the UE 94 via an UL scheduled grant based on the estimated UL channel quality (step 3 in FIG. 3). It is worth mentioning that a Time Division Duplex (TDD) system (such as an LTE system) could rely on channel reciprocity, however this may not provide a full knowledge of UL channel conditions.

Although the scheduling strategy is implementation-specific and not specified by 3GPP, the overall goal of most schedulers is to take advantage of the channel variations between the mobile terminals, and preferably schedule transmissions to a mobile terminal on resources with advantageous channel conditions. This is valid for both LTE and HSPA. The main advantage in the LTE case is the fact that one can also exploit the frequency diversity, whereas, in HSPA, the scheduler can only exploit time-domain variations. For large bandwidths supported by LTE, where a significant amount of frequency-selective fading often will be experienced, the possibility for the scheduler to exploit the frequency domain becomes extremely important compared to exploiting only the time-domain, especially at low speeds or for fixed devices (such as M2M devices/gateways) where the variations in the time domain are relatively slow compared to the delay requirements set by many services.

In summary, most channel-dependent scheduling strategies, either in the uplink or in the downlink, need some information about: (i) Channel conditions at the terminal/base station; (ii) buffer status (at the terminal/base station) and priorities of the different data flows; and (iii) interference situation in neighboring cells. There are different ways this information could be obtained at the scheduler, but, generally, a scheduler relies on some sort of reported information from the terminals to the network.

Because the inventive aspects of the present disclosure are discussed later with reference to an LTE system, the discussion below now provides general background information about scheduling in LTE. Similar scheduling approaches may be present in other non-LTE systems as well, but, for the sake of brevity, only the LTE system is discussed below. However, such LTE-limited discussion should not be construed to limit the scope of the present disclosure to LTE-based systems only. Rather, as mentioned later, the teachings of the present disclosure can be applied to other non-LTE systems as well.

Scheduling in LTE

In LTE, the scheduler is part of the Medium Access Control (MAC) layer and controls the assignment of uplink and downlink radio resources. The eNodeB makes a scheduling decision for each 1 ms of Transmission Time Interval (TTI) (i.e., 1 ms subframe of a 10 ms radio frame in LTE) and sends scheduling information to the selected set of terminals. There is also a possibility for semi-persistent scheduling to reduce the control-signaling overhead.

Uplink and downlink scheduling are separated in LTE, and uplink and downlink scheduling decisions can be taken independently of each other. In LTE, the basic scheduling operation is so-called dynamic scheduling, where the eNodeB sends scheduling information in each 1 ms TTI (or subframe) to the selected set of terminals (over Physical Downlink Control Channels (PDCCHs)), controlling the uplink and downlink transmission activity. The terminal follows scheduling commands, for both uplink and downlink, from a single cell only—i.e., the serving cell.

LTE Downlink Scheduler

FIG. 4 shows an exemplary operational arrangement for an LTE downlink scheduler 96. The DL scheduler 96 may be part of a base station or eNodeB 92. For ease of discussion, the same reference numeral "92" is used in FIGS. 2-5 to refer to a base station or eNB, and the same reference numeral "94" is used in FIGS. 2-5 to refer to a UE (which, as mentioned before, may be an M2M communication entity as well) or a dedicated M2M device or other wireless terminal. In LTE, the downlink scheduler 96 is responsible for dynamically controlling the terminals to transmit to and, for each of these terminals, the set of Resource Blocks (RBs) upon which the terminal's Downlink Shared Channel (DL-SCH) should be transmitted. Transport format selection (i.e., the selection of transport block size, modulation scheme, and code rate) and logical channel multiplexing for downlink transmissions are typically controlled by the eNodeB 92.

In most cases, a single terminal cannot use the full capacity of the cell, for example, due to lack of data. Also, as the channel properties may vary in the frequency domain, it is useful to be able to transmit to different terminals on different parts of the spectrum. Therefore, the scheduler 96 may schedule multiple terminals in parallel in an LTE subframe, in which case there is one DL-SCH per scheduled terminal, each such terminal is dynamically mapped to a (unique) set of frequency resources. The scheduler 96 is in control of the instantaneous data rate used, and, hence, the Radio Link Control (RLC) segmentation and MAC multiplexing will be affected by the scheduling decision. Although formally part of the MAC layer, the scheduler 96 controls most of the functions in the eNodeB 92 associated with downlink data transmission such as, for example, (i) RLC segmentation/concatenations of different RLC data buffers 98-1 through 98-$n$ in the eNB 92 for different scheduled terminals; (ii) MAC multiplexing of logical channels (which may be carried out using a MAC multiplexing unit 100), and (iii) L1 coding, modulation and number of transmission layers in the case of spatial multiplexing (all of which may use a modulation and coding unit 102 in the eNodeB 92). The choices of these parameters are mainly determined by the data rate, that is, the transport block size.

Information about channel conditions at the terminal can be obtained in several ways. Typically, the eNodeB 92 relies on what is called a "channel-status" report (described later below) from the terminal 94, as indicated by dashed arrow 104 in FIG. 5 (and by step 3 in FIG. 2). (The UE 94 may estimate DL channel quality to be reported to eNodeB 92 as discussed earlier with reference to step 2 in FIG. 2.) However, additional sources of channel knowledge can also be exploited by a particular scheduler.

In addition to the channel quality, the scheduler 96 may also take terminal's buffer status and priority levels into account. It does not make sense to schedule a terminal with empty transmission buffers. On the other hand, priorities of the different types of traffic may also vary. For example, Radio Resource Control (RRC) signaling may be prioritized over user data, and RLC and Hybrid Automatic Repeat Request (HARQ) retransmissions may take priority over initial data transmissions.

LTE Downlink Scheduler: Channel-Status Reporting

As mentioned earlier, terminals operating in a wireless network may exchange information via a base station in the network. The exchange may be in the form of channel feedback or channel status report for the communication channel/link between the base station and the wireless terminals. Although referred to as "channel status reports", what a terminal delivers to the network in LTE are not explicit reports of the downlink channel status. Rather, what the terminal delivers are recommendations on what transmission configuration and related parameters the network should use if/when transmitting to the terminal on the Downlink Shared Channel (DL-SCH).

The channel status reports may include, for example, one or more of the following: (i) A Rank Indicator (RI) to indicate channel rank or the number of useful transmission layers (for the data channel) that may be preferably used by/for downlink transmission to the terminal. (ii) A Precoder Matrix Indicator (PMI) indicating a preferred precoding matrix for shaping the transmit signal (to be sent to the UE). The reported precoder may be determined assuming the number of layers indicated by the RI. PMI is typically only reported if the terminal is configured to be in closed-loop spatial multiplexing mode. In case of open-loop spatial multiplexing, the network instead selects the precoder matrix to use for transmission according to a pre-defined rule (rather than receiving the precoder recommendation from the terminal). The precoder recommendation may be frequency-selective, implying that the terminal may recommend different precoders for different parts of the downlink spectrum. (iii) Channel Quality Indicator (CQI) indicating channel quality of the wireless communication channel between the base station and the UE. The CQI may represent the recommended modulation scheme and coding rate that should, preferably, be used for the downlink transmission. The CQI typically points to a table that consists of a set of pre-defined modulation-scheme/coding-rate combinations.

The channel feedback or channel status report may also include estimates of channel coefficients. The channel feedback may enable the base station to adaptively configure a suitable transmission scheme to improve coverage or user data rate or to more accurately "predict" channel quality for future transmissions to the terminals.

Channel status reports can be categorized as wideband reports, reflecting the status of a channel over the entire cell bandwidths, and per sub-band reports, reflecting status of a channel over each sub-band. The different granularities can be configured by the network obeying a compromise between estimation accuracy and signaling overhead.

The recommendation—i.e., a channel status report—that is delivered by the terminal does not need to be followed by the network. However, information about the actual modulation scheme and coding rate used for DL-SCH transmission is generally always included in the downlink scheduling assignment and the terminal preferably always uses this for demodulation and decoding of the actual DL-SCH transmission.

The channel status reporting can either be periodic or aperiodic (e.g., a trigger-based report). An aperiodic or trigger-based channel status report is delivered when explicitly requested by the network by means of a 'channel-status request' flag included in the uplink scheduling grant. This aperiodic channel status report is generally always delivered using Physical Uplink Shared Channel (PUSCH)—i.e., on a dynamically assigned resource. Periodic reports, in contrast, are configured by the network to be delivered with a certain periodicity, possibly as often as once in every 2 ms. The different types of information does not need to be reported with the same period. Typically, RI can be reported less often, compared to the reporting of PMI and CQI, reflecting the fact that the suitable number of layers (as indicated by RI) typically varies on a slower basis as compared to the channel variations (as reported through PMI and CQI) that impact the choice of precoder matrix and modulation rate and coding scheme. Normally, periodic channel status reports are delivered using Physical Uplink Control Channel (PUCCH) physical channel. However, similar to HARQ acknowledgements (which are normally delivered on PUCCH), channel status reports also may be routed to the PUSCH if the terminal has a valid uplink grant and is anyway to transmit on the PUSCH.

LTE Uplink Scheduler

FIG. 5 shows an exemplary operational arrangement for an LTE uplink scheduler 106. As illustrated, the UL scheduler 106 may be part of the base station 92. In certain embodiments, the DL scheduler 96 (FIG. 4) and the UL scheduler 106 (FIG. 5) may be implemented in a single scheduler unit (not shown in FIGS. 4-5, but shown in FIG. 16) having both DL and UL scheduling capabilities. In LTE, the uplink scheduler 106 serves a similar purpose compared to the downlink scheduler 96, namely to dynamically control which mobile terminals are to transmit on their Uplink Shared Channel (UL-SCH) and on which uplink radio resources.

Differently from HSPA, the uplink is orthogonal in LTE and the shared resource controlled by the eNodeB's UL scheduler 106 is time-frequency resource units. The eNodeB scheduler 106 is also responsible for controlling the transport format (i.e., payload (or transport block) size, modulation scheme, etc.) the mobile terminal 94 shall use, which means that there is no need for out-of-band control signaling from the mobile terminal 94 to eNodeB 92. As a consequence, accurate and detailed knowledge about the terminal situation with respect to buffer status and power availability is more accentuated in LTE.

The basis for uplink scheduling are so-called "scheduling grants" (illustrated by step 3 in FIG. 3), containing the scheduling decision (from the UL scheduler 106) and providing the terminal 94 with information about the resources and the associated transport format (e.g., transport block size, and modulation scheme) to use for transmission on UL-SCH. A terminal is allowed to transmit on the UL-SCH only if the terminal has a valid scheduling grant. Dynamic grants may be valid for one subframe (of 1 ms duration). That is, for each subframe in which the terminal is to transmit on the UL-SCH, the UL scheduler transmits a corresponding grant on a downlink PDCCH.

The terminal 94 monitors the set of PDCCHs for uplink scheduling grants. If a valid grant intended for the terminal is detected in a subframe n, the actual transmission of the uplink data takes place in subframe n+4 for Frequency Division Duplex (FDD).

LTE Uplink Scheduler: Frequency-Selective Scheduling

Similarly to the downlink case (discussed earlier with reference to FIGS. 2 and 4), the uplink scheduler 106 can exploit information received from the UE 94 about the channel conditions, buffer status, and priorities of the different data flows, and, if some form of interference coordination is employed (e.g., as discussed later with reference to FIG. 8), the scheduler 106 may also receive information from the UE 94 related to the interference situation in neighboring cells. In FIG. 5, the UE 94 is shown to include a plurality of RLC data buffers 108-1 through 108-$m$, which are coupled to a UE-based MAC multiplexing unit 110 and a priority handling unit 112. The priority handling unit 112 may report RLC buffer status and associated priorities of different data flows to the UL scheduler 106 as indicated by dashed arrow 114. The MAC multiplexing unit 110 may be coupled to a modulation and coding unit 115, which may receive earlier-mentioned transport format-related control information (e.g., transport block size, and modulation scheme) via the UL scheduling grants sent to the UE 94 from the UL scheduler 106, as indicated by dashed arrow 116 in FIG. 5 (and related to step 3 in FIG. 3).

It is noted here that a detailed discussion of functionalities of units such as RLC buffers, MAC multiplexers, modulation and coding units, etc., is not provided with reference to FIGS. 4 and 5 because of lack of relevance of such discussion to the inventive aspects of present disclosure and because of sufficiently well-known nature of such units.

In the uplink, estimates of the channel quality can be obtained (by the eNodeB 92) from the use of uplink "channel-sounding" using Sounding Reference Signals (SRS) from the UE 94 (as indicated by steps 1 and 2 in FIG. 3). The performance of frequency-selective scheduling (by the UL scheduler 106) using the SRS depends on the sounding bandwidth and the quality of the channel estimate (step 2 in FIG. 3), the latter being a function of the transmission power spectral density used for the SRS. With a large sounding bandwidth, link quality can be evaluated on a larger number of Resource Blocks (RBs). However, this is likely to lead to the SRS being transmitted at a lower power density, due to the limited total UE transmit power, and this reduces the accuracy of the estimate for each RB within the sounding bandwidth. Conversely, sounding a smaller bandwidth can improve channel estimation on the sounded RBs, but results in missing channel information for certain parts of the channel bandwidth, thus risking exclusion of the best quality RBs. As an example, experiments discussed in a Motorola submission "R1-071340: Considerations and Recommendations for UL Sounding RS", www.3gpp.org, 3GPP TSG RAN WG1 (where "TSG" refers to Technical Specification Group and "WG" refers to Working Group), meeting 48bis, St Julian's, Malta, March 2007, show that at least for a bandwidth of 5 MHz, frequency-selective scheduling based on full-band sounding outperforms narrower bandwidth sounding.

As noted earlier, the uplink scheduler (e.g., the scheduler 106) is in complete control of the transport format the mobile terminal shall use, whereas the logical channel multiplexing is controlled by the terminal according to a set of rules. Thus, uplink scheduling is per mobile terminal and not per radio bearer.

SUMMARY

One of the requirements in M2M-type scenarios is low energy consumption due to the simplicity of M2M devices/ gateways. As mentioned earlier, such M2M devices could be, among other things, very simple sensors placed in fixed positions.

On the other hand, cellular networks were conceived to enable mobile communications and, modern systems such as the 3GPP's Universal Mobile Telecommunications System (UMTS) and LTE systems are highly adaptive to the varying properties of the radio channel over the time-frequency domains (due to device mobility). To support mobility and transmission adaptation in different dimensions all over the network, these systems need a significant amount of control signaling reported by the mobile devices. Channel-dependent scheduling, discussed earlier, is one of the main components of modern mobile communications systems. As discussed with reference to FIGS. 2-5, an eNodeB-based scheduler adapts the downlink and uplink transmission parameters—such as the allocated radio resources—based on the channel conditions. In order to do so, some sort of channel information must be reported by the device to the base station or scheduler.

However, many sensors or M2M devices are expected to transmit with very low activity and with long periods of inactivity between transmissions. For example, if an M2M communication entity is a building surveillance sensor or unit, it may be configured to transmit surveillance data at predefined time intervals or may not transmit data for certain portions of the building (e.g., during daytime business hours when the building has known occupants) so as, for example, not to overload cellular network resources. Also, sensors may typically transmit small amounts of information at a time—typically a few hundred octets of data—indicating, for example, a measurement or presence. Some sensors serve as actuating receivers, where a short message from the network of a few hundred octets of data may need to be processed and acted on. Hence, for such device types or application categories, the existing signaling mechanisms for establishing and maintaining a connection may be considered as considerably "heavy" when contrasted with a small amount of payload data. In such cases, there is a real concern that the volume of signaling traffic related to scheduling may quickly overwhelm the cellular network, especially when there is a large number of sensors or M2M devices deployed in the network. In other words, the signaling overhead can no longer be considered negligible. In addition, keeping a connection up or re-establishing a connection on wake-up may constitute an undue burden on a wireless device with a targeted battery life that spans years.

Due to these reasons, the usage of M2M type of communication over cellular networks is challenged by the high amount of control signaling, mainly due to channel information reports needed to be sent from the device to the uplink/downlink schedulers to enable proper scheduling for the device.

The uplink and downlink schedulers in the current cellular systems do not exploit the fact that certain devices within a cell remain primarily stationary and almost always transmit/receive from the same position or physical location. It is noted here that the terms "static" and "stationary" may be used interchangeably herein to refer to a wireless device (which may include M2M and non-M2M devices as mentioned earlier) whose position or physical location is primarily stationary (or substantially non-moving) relative to the serving base station/eNodeB. A wireless device physically fixed at a particular location or substantially non-mobile is an example of a "stationary" device. Whether a wireless device is primarily stationary or not may be determined using any of the methods known in the art. For example, in one embodiment, such determination may be based on the approaches discussed in the following co-pending and commonly-assigned United States Patent Applications: (1) Application titled "Methods and Devices for Adjusting Resource Management Procedures Based on Machine Device Capability Information," having application Ser. No. 13/728,360 (hereafter "Reference-1"), and (2) Application titled "Methods and Devices for Adjusting Resource Management Procedures Based on Machine Device Capability Information," having application Ser. No. 13/633,728. The disclosures of these two United States patent applications are incorporated herein by reference in their entireties.

To illustrate signaling overhead-related problems with existing scheduling mechanisms for stationary devices, let us assume a channel-dependent scheduler for both uplink and downlink (e.g., schedulers 96 and 106 shown in FIGS. 4 and 5, respectively). In the case of the downlink, because the device is fixed, the channel-dependent scheduling will receive several channel status reports with the same values associated with the same configured sub-bands, resulting in useless control signaling overhead over the uplink control channels PUSCH (if the UE/device has been granted uplink resources) or PUCCH (if the UE/device does not have any uplink resource granted). Such a useless overhead may be very costly for this type of device, mainly if the network has configured the reports to be periodic and within a high number of control sub-bands. This useless signaling over PUCCH also represents additional system interference, bad for the overall cell performance.

In the case of the uplink, the stationary device will certainly repeat the transmission of SRS over the same sub-bands at some point in time, which also represents a useless control signaling because the device is static and, the previous SRS values could have been stored and reused by the scheduler.

The reported values may not always be the same, because there could be variation in the radio conditions, mainly due to interference, over the different periods the devices are reporting the channel information. However, these variations are generally averaged out when a large number of reports are collected.

To minimize the effect from signaling overhead, or at least to make its effect less pronounced, there could be applications where the timing the data needs to be transmitted is not so important. In that case, the UE could be triggered to send data in periods when the cell load is very low. This approach may use statistical information (e.g., through machine learning) about the load history of that cell. This could be done even for smartphones when it comes to transmission of data for background applications. This is a technique which allows the transmission of traffic as a "best effort" traffic at periods during which the network is not loaded, and hence this best-effort traffic does not negatively impact (or has negligible impact) on the performance of other users' traffic of higher priority. The problem with this solution is that, although payload data transmissions are conveniently delayed, the scheduling-related signaling overhead is still not minimized, neither in absolute nor relative numbers.

The same problem exists with a similar approach in which statistical data may be used to transmit in periods with low interference from other cells. Because the UL quality is known at the base station, such periods of "low interference" may be determined by the base station. In any event, this selective data transmission approach also fails to address or minimize the scheduling-related signaling overhead.

As noted earlier, current cellular systems—such as LTE and UMTS—are highly adaptive to radio channel variations due to device mobility. However, these systems do not effectively take into account the situation that some devices may be placed in fixed (non-mobile) positions. Consequently, these systems do not advantageously exploit non-mobility related reduction in scheduling-related signaling overhead. Despite the fact that channel reports to be used by the scheduler may be configured to low mobility users—e.g., using periodic, aperiodic, or even semi-persistent (reported less often) reporting, current systems still do not use previous knowledge about these channel reports in future resource allocations because the common assumption is that a mobile device will not transmit from the same position all the time. The non-exploitation of the fact that the device is fixed represents a non-optimized usage of control signaling, which needs to be reduced for this type of devices (e.g., M2M devices in fixed positions) not only to conserve their energy (battery power) but also to reduce unnecessary signaling traffic in the network.

It is therefore desirable to devise a new approach to radio network interface and radio resource management, especially in the context of scheduling of wireless devices that are primarily stationary or substantially non-mobile/fixed.

Particular embodiments of the present disclosure exploit the non-mobile nature of static devices to optimize certain aspects of the cellular network to them. More specifically, in the context of primarily stationary wireless devices, the present disclosure provides a system and method for reducing the signaling overhead due to protocol actions (i.e., transmissions of scheduling requests and grants) as well as due to the channel reporting needed to support channel-dependent scheduling approaches. Particular embodiments of the present disclosure offer a solution to reduce the signaling overhead of channel information reports used by a channel dependent scheduler by exploiting the fact that certain wireless devices in the network will be static and, hence, time-frequency channel conditions will have a much lower variance for such static devices as compared to other mobile devices in the network. In the solution according to particular embodiments of the present disclosure, overhead due to signaling and associated control is reduced in case the channel is not varying in time—e.g., due to lack of movement of terminals/sensors. In such a situation, the (semi) stationary channel can be learned (or estimated) over time with the help of statistical methods and machine learning techniques, and stationary devices can be then instructed to stop reporting uplink and/or downlink channel condition related information to the network until further notice. As a byproduct of this solution, the energy consumed within such stationary terminals/sensors (which may include M2M communication entities) is reduced due to significant reductions in the number of channel measurements, their processing, and reporting.

In one embodiment, the present disclosure is directed to a method for reducing signaling overhead related to scheduling of Uplink (UL) and Downlink (DL) radio resources to a wireless device that is in wireless communication with a network entity in a mobile communication network associated with the wireless device and that receives UL and DL scheduling information from the network entity. The method comprises performing the following using the network entity: (i) Upon detecting that the wireless device is stationary, performing at least one of the following: (a) statistically analyzing DL channel condition related information received from the wireless device over a first predetermined time interval to determine device-specific DL scheduling resources to allocate to the wireless device, and (b) statistically analyzing UL channel condition related information received from the wireless device over a second predetermined time interval to determine device-specific UL scheduling resources to allocate to the wireless device; and (ii) upon conclusion of statistical analysis, instructing the wireless device to perform at least one of the following: (a) stop reporting DL channel condition related information to the network entity until further notice, and (b) stop reporting UL channel condition related information to the network entity until further notice.

In another embodiment, the present disclosure is directed to a mobile communication node configured to provide a radio interface to a wireless device in a wireless network associated with the wireless device. The mobile communication node comprises: a transceiver configured to transmit wireless signals to and receive wireless signals from the wireless device; a scheduler configured to send UL and DL radio resource scheduling information to the wireless device via the transceiver, and receive DL and UL channel condition related information from the wireless device via the transceiver; and a processor coupled to the transceiver and the scheduler. The processor is configured to perform at least one of the following upon detecting that the wireless device is stationary: (i) statistically analyze DL channel condition related information received by the scheduler from the wireless device over a first predetermined time interval to determine device-specific DL scheduling resources to allocate to the wireless device, and (ii) statistically analyze UL channel condition related information received by the scheduler from the wireless device over a second predetermined time interval to determine device-specific UL scheduling resources to allocate to the wireless device. The processor is further configured to provide the scheduler with results of statistical analysis. Upon receiving the results of statistical analysis from the processor, the scheduler is operable to send an instruction to the wireless device via the transceiver, wherein the instruction instructs the wireless device to perform at least one of the following. (i) stop reporting DL channel condition related information to the mobile communication node until further notice, and (ii) stop reporting UL channel condition related information to the mobile communication node until further notice.

In a further embodiment, the present disclosure is directed to a method for reducing signaling overhead related to scheduling of UL and DL radio resources to a wireless device that is in wireless communication with a network entity in a mobile communication network associated with the wireless device. The method comprises performing the following using the wireless device: (i) reporting at least one of the following to the network entity: (a) DL channel condition related information, and (b) UL channel condition related information; (ii) monitoring a DL control channel that provides UL and DL radio resource scheduling information from the network entity; (iii) identifying whether the DL control channel includes one of the following device-specific indicators for the wireless device: (a) a first indicator with a first predetermined value, and (b) a second indicator with a second predetermined value; (iv) discontinuing the reporting of DL channel condition related information to the network entity when the wireless device receives the first indicator with the first predetermined value from the DL control channel; and (v) discontinuing the reporting of UL channel condition related information to the network entity when the wireless device receives the second indicator with the second predetermined value from the DL control channel.

In another embodiment, the present disclosure is directed to a wireless device that is in wireless communication with a network entity in a mobile communication network associated with the wireless device. The wireless device comprises: a transceiver configured to transmit wireless signals to and receive wireless signals from the network entity; and a processor coupled to the transceiver. The processor is configured to perform the following: (i) report at least one of the following to the network entity using the transceiver: (a) DL channel condition related information, and (b) UL channel condition related information; (ii) monitor, using the transceiver, a DL control channel that provides UL and DL radio resource scheduling information from the network entity; (iii) identify whether the DL control channel includes one of the following device-specific indicators for the wireless device: (a) a first indicator with a first predetermined value, and (b) a second indicator with a second predetermined value; (iv) discontinue the reporting of DL channel condition related information to the network entity when the processor receives, via the transceiver, the first indicator with the first predetermined value from the DL control channel; and (v) discontinue the reporting of UL channel condition related information to the network entity when the processor receives, via the transceiver, the second indicator with the second predetermined value from the DL control channel.

In a still further embodiment, the present disclosure is directed to a system for reducing signaling overhead related to scheduling of UL and DL radio resources in a mobile communication network. The system comprises a wireless device that is in wireless communication with a mobile communication node in the mobile communication network. The system also comprises the mobile communication node for providing a radio interface to the wireless device in the mobile communication network. In the system, the wireless device is configured to perform the following: (i) report at least one of the following to the mobile communication node: DL channel condition related information, and UL channel condition related information; (ii) monitor a DL control channel that provides UL and DL radio resource scheduling information from the mobile communication node; (iii) identify whether the DL control channel includes one of the following device-specific indicators for the wireless device: a first indicator with a first predetermined value, and a second indicator with a second predetermined value; (iv) discontinue the reporting of DL channel condition related information to the mobile communication node when the wireless device receives the first indicator with the first predetermined value from the DL control channel; and (v) discontinue the reporting of UL channel condition related information to the mobile communication node when the wireless device receives the second indicator with the second predetermined value from the DL control channel. In the system, the mobile communication node is configured to perform the following: (i) send DL and UL radio resource scheduling information to the wireless device and receive DL and UL channel condition related information from the wireless device; (ii) upon detecting that the wireless device is stationary, perform at least one of the following: (a) statistically analyze DL channel condition related information received from the wireless device over a first predetermined time interval to determine device-specific DL scheduling resources to allocate to the wireless device, and (b) statistically analyze UL channel condition related information received from the wireless device over a second predetermined time interval to determine device-specific UL scheduling resources to allocate to the wireless device; and (iii) upon conclusion of statistical analysis, send the DL control channel with the first indicator or the second indicator to the wireless device, thereby instructing the wireless device to perform one of the following: (a) stop reporting DL channel condition related information to the mobile communication node until further notice when the DL control channel contains the first indicator, and (b) stop reporting UL channel condition related information to the mobile communication node until further notice when the DL control channel contains the second indicator.

In another embodiment, the present disclosure is directed to a mobile communication node that is configured to provide a radio interface to a wireless device in a wireless network associated with the wireless device. The mobile communication node is configured to perform the following: (i) receive DL and UL channel condition related information from the wireless device; (ii) upon detecting that the wireless device is stationary, perform at least one of the following: (a) statistically analyze DL channel condition related information received from the wireless device over a first predetermined time interval to determine device-specific DL scheduling resources to allocate to the wireless device, and (b) statistically analyze UL channel condition related information received from the wireless device over a second predetermined time interval to determine device-specific UL scheduling resources to allocate to the wireless device; (iii) upon conclusion of statistical analysis, send a Downlink Control Information (DCI) message to the wireless device instructing the wireless device to perform one of the following: (a) stop reporting DL channel condition related information to the mobile communication node until further notice, and (b) stop reporting UL channel condition related information to the mobile communication node until further notice.

Thus, in the exemplary case of 3GPP cellular networks, such as UMTS and LTE networks, certain embodiments of the present disclosure reduce scheduling-related signaling overhead by exploiting network's knowledge that there are stationary devices operating in the network and by suitably applying machine-learning techniques to uplink and downlink channel-dependent schedulers. Particular embodiments of the present disclosure may provide a network and UE/device based combined solution. In addition, so long as the wireless communication performance remains acceptable, reduction in a wireless device's power consumption can be achieved by reusing precoding matrices, rank indicators, etc., that are earlier reported by the device (as part of its channel status reports), instead of requiring the device to calculate such parameters continuously. When performance degradation is noticed by the eNodeB, the scheduler has the alternative to trigger/instruct the device to perform these calculations again. Furthermore, by reducing the need for PUCCH transmissions (for channel status reporting by the device), particular embodiments of the present disclosure increase system capacity and reduce the interference in neighbor cells. In this scenario, stationary UEs or other wireless devices report aperiodically and use PUCCH transmission only if clear performance degradation is perceived at the network.

BRIEF DESCRIPTION OF THE DRAWINGS

In the following section, the present disclosure will be described with reference to exemplary embodiments illustrated in the figures, in which:

FIG. 5 shows an exemplary operational arrangement for an LTE uplink scheduler;

FIG. 6 is a diagram of an exemplary wireless system in which the signaling overhead reduction methodology according to the teachings of one embodiment of the present disclosure may be implemented;

FIG. 9 depicts an example of how interference estimation may be performed by a network entity;

FIG. 10 pictorially illustrates the basic methodology of DL scheduling-related signaling overhead reduction according to one embodiment of the present disclosure;

DETAILED DESCRIPTION

Figure 1:
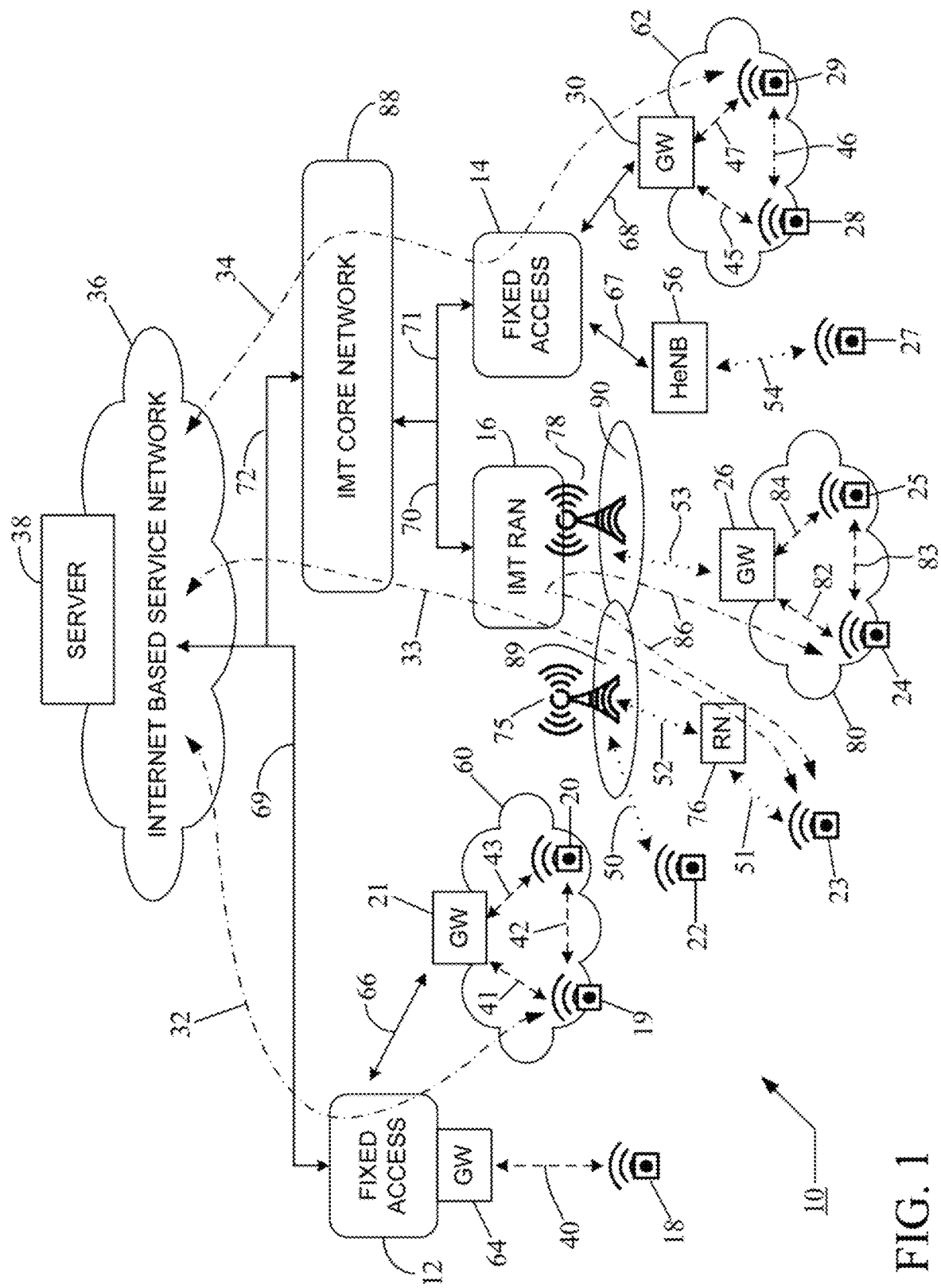
FIG. 1 illustrates an exemplary M2M communications system using fixed and wireless (mobile) Access Networks.
Figure 2:
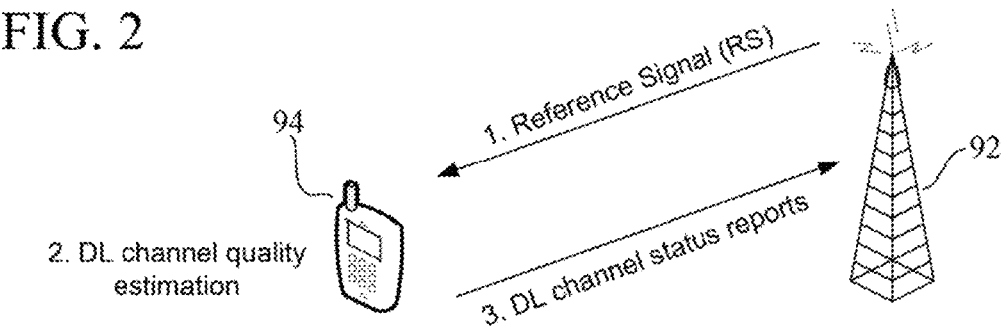
FIG. 2 illustrates general principles of channel-dependent scheduling in the downlink.
Figure 3:
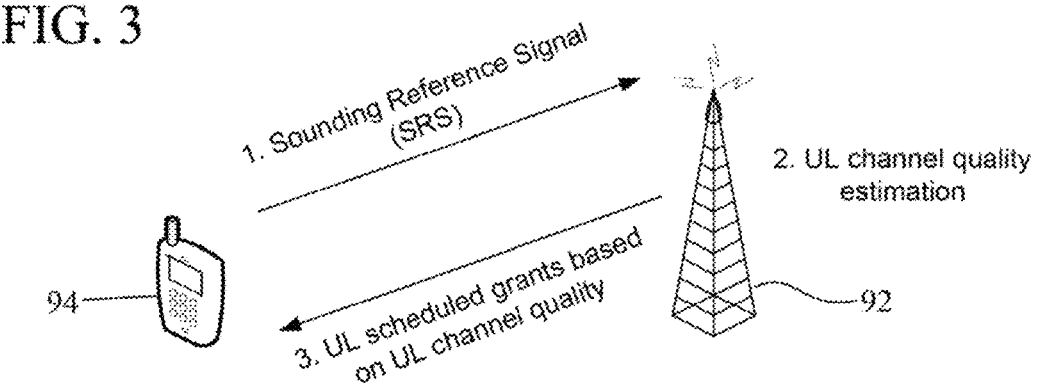
FIG. 3 illustrates general principles of channel-dependent scheduling in the uplink.

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the present disclosure. It should be understood that the disclosure is described primarily in the context of a 3GPP cellular telephone/data network, but it can be implemented in other forms of cellular or non-cellular wireless networks as well.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term (e.g., "well-known," "device-specific," "channel-status report," etc.) may be occasionally interchangeably used with its non-hyphenated version (e.g., "well known," "device specific," "channel status report," etc.), a capitalized entry (e.g., "Uplink," "Downlink," Radio Resource Management", etc.) may be interchangeably used with its non-capitalized version (e.g., "uplink," "downlink," "radio resource management", etc.), and plural terms may be indicated with or without an apostrophe (e.g., UE's or UEs, eNodeB's or eNodeBs, etc.). Such occasional interchangeable uses shall not be considered inconsistent with each other.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing voice information or non-voice data/control information) to/from the second entity regardless of the type (analog or digital) of those signals. It is further noted that various figures (including component diagrams) shown and discussed herein are for illustrative purpose only, and are not drawn to scale.

FIG. 6 is a diagram of an exemplary wireless system 120 in which the signaling overhead reduction methodology according to the teachings of one embodiment of the present disclosure may be implemented. The system 120 may include a plurality of wireless terminals or devices (one such wireless device 122 is shown in FIG. 6) that are in wireless communication with a wireless network 124 through a base station (also interchangeably referred to herein as a "network entity," "communication node," or simply a "node") 126 of the network 124. The network 124 may be operated, managed, owned by a wireless service provider (or operator). The base station 126 may be, for example, a base station in a 3G network, or an evolved Node-B (eNodeB or eNB) or Home eNodeB (HeNB) when the carrier network is an LTE network, or any other home base station or femtocell, and may provide radio interface (e.g., an RF channel) to the wireless device 122 via an antenna (or antenna unit) 127. The radio interface is depicted by the exemplary wireless link 128. In other embodiments, the base station 126 may also include a site controller, an access point (AP), a radio tower, or any other type of radio interface device capable of operating in a wireless environment. In one embodiment, the base station 126 may be configured to implement an intra-cell or inter-cell Coordinated Multi-Point (CoMP) transmission/reception arrangement. In addition to providing air interface or wireless channel (e.g., as represented by wireless link 128 in FIG. 6) to the device 122 via antenna 127, the communication node (or base station) 126 may also perform radio resource management (as, for example, in case of an eNodeB or HeNB in an LTE system) using, for example, the channel feedback reports received from the wireless device 122 operating in the network 124.

It is noted here that the term "channel," as used herein, may refer to a single, physical over-the-air interface between the base station 126 and the terminal 122. However, between any two points (e.g., a transmit antenna and a receive antenna), there may be a specific effective channel response, summarizing all the signal losses, signals bouncing off of obstacles, etc. This effective channel response between any such two points may be represented by a "channel coefficient." In that regard, as discussed in later below, the scheduling-related signaling overhead reduction as per teachings of particular embodiments of the present disclosure has its highest potential in more stable radio environments—i.e., where the channel coefficients are highly correlated over time for the same sub-bands.

Figure 7A:
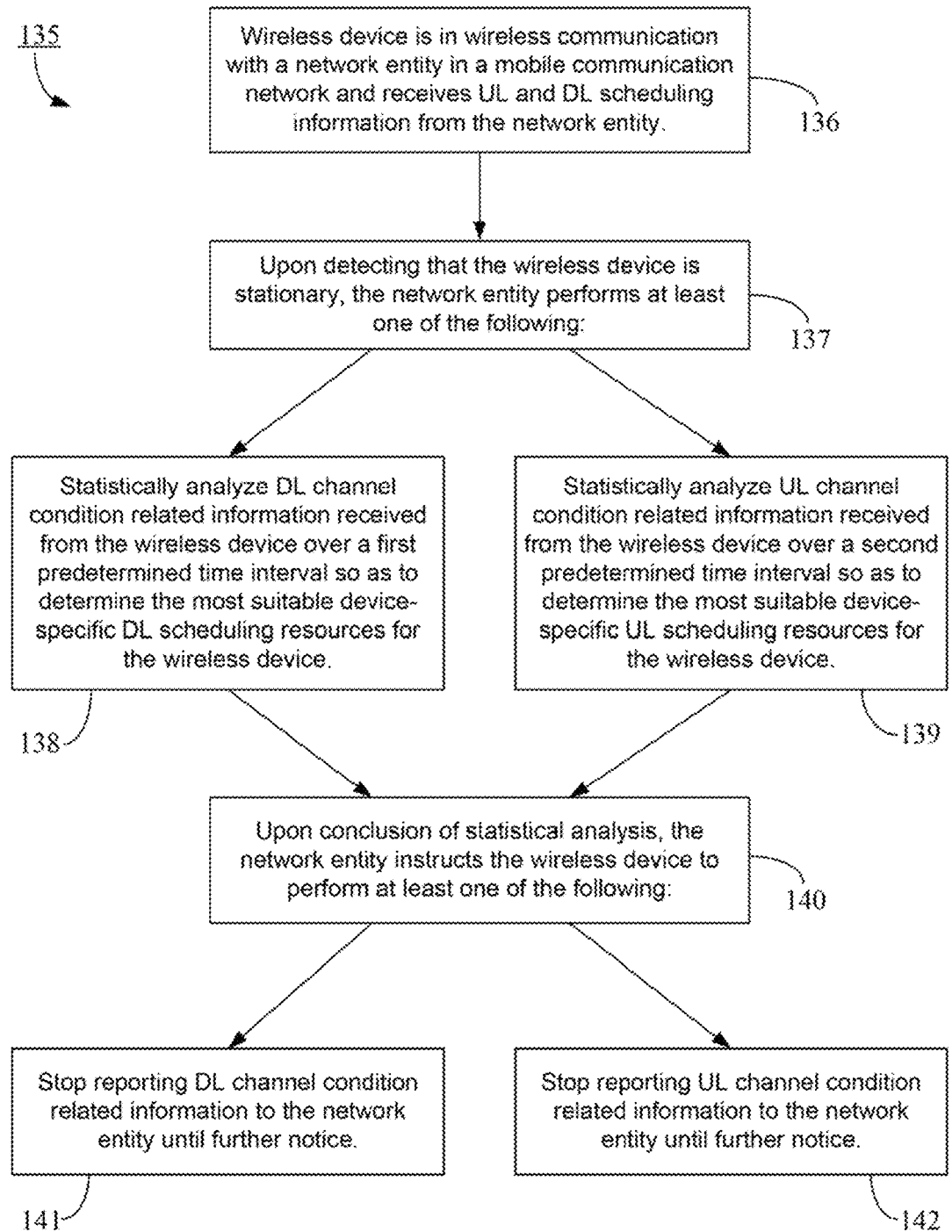
FIG. 7A is an exemplary flowchart depicting steps that may be performed by a network entity according to the teachings of one embodiment of the present disclosure.
Figure 7B:
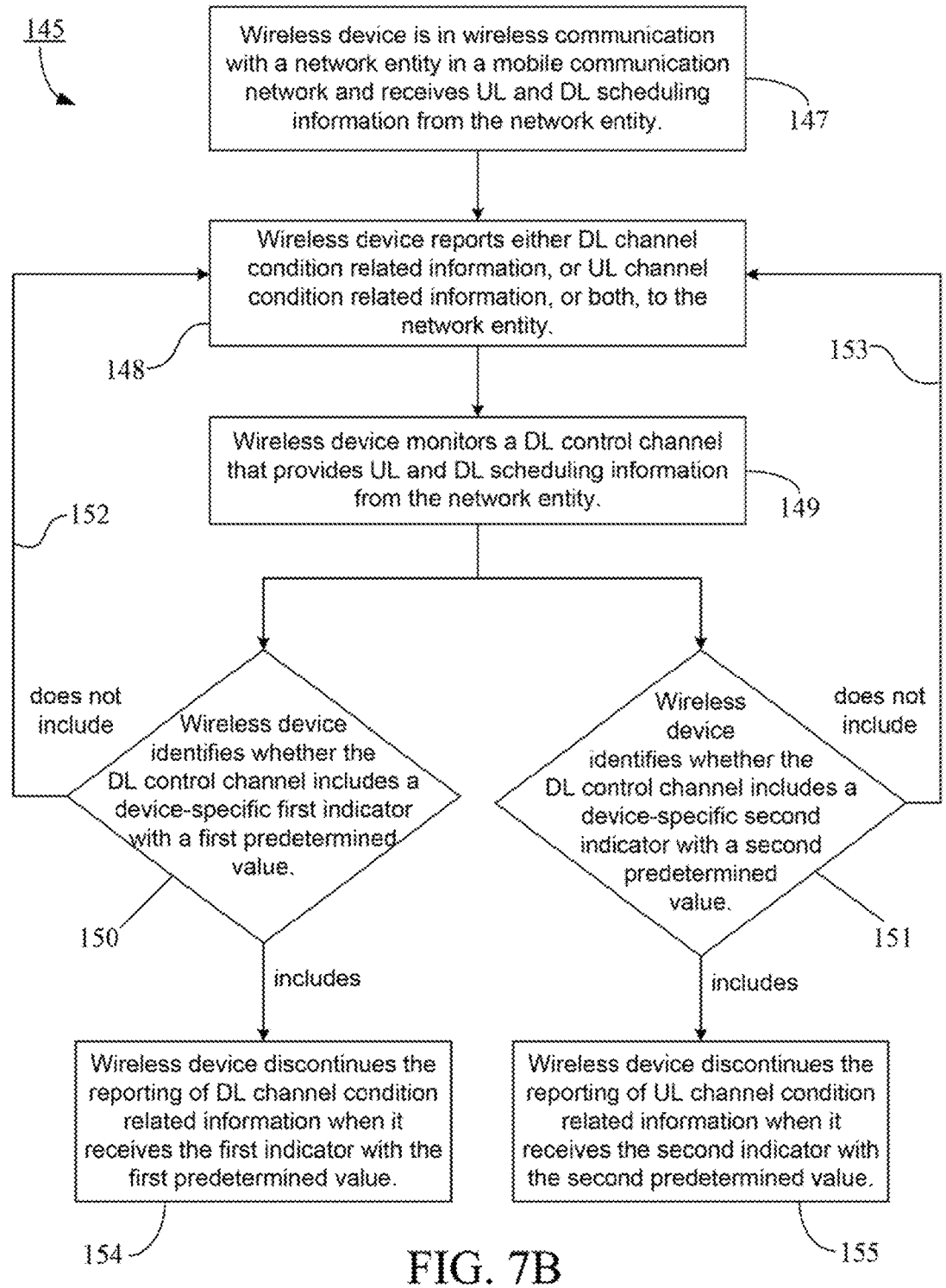
FIG. 7B is another exemplary flowchart depicting steps that may be performed by a wireless device according to the teachings of one embodiment of the present disclosure.

In case of a 3G carrier network 124, the network entity 126 may include functionalities of a 3G base station along with some or all functionalities of a 3G Radio Network Controller (RNC). Various base stations—whether 3G base stations or base stations in other types of carrier networks (e.g., Fourth Generation (4G) networks and beyond)—may be configured as discussed below to implement the signaling overhead solution according to particular embodiments of the present disclosure. For example, in one embodiment, the base station 126 may be configured (in hardware, via software, or both) to implement the scheduling-related signaling overhead reduction methodology as discussed herein. For example, when existing hardware architecture of the base station 126 cannot be modified, the signaling overhead methodology according to one embodiment of the present disclosure may be implemented through suitable programming of one or more processors and/or schedulers (e.g., processor 232 (or, more particularly, the processing unit 237) and scheduler 239 in FIG. 16) in the network entity 126. The execution of the program code (by a processor and/or scheduler in the node 126) may cause the processor and scheduler to perform appropriate method steps—e.g., statistical analysis of UL and DL channel condition related information received from the stationary wireless device 122, and instructing the wireless device 122 to stop reporting such channel condition related information until further notice—which are illustrated in FIG. 7A (discussed later below). Thus, in the discussion below, although the base station 126 may be referred to as "performing," "accomplishing," or "carrying out" a function or process, such performance may be technically accomplished in hardware and/or software as desired. Similarly, the wireless device 122 may be suitably configured (in hardware and/or software) to provide UL and/or DL channel condition related information to the base station 126, receive transmissions/instructions from the base station 126, and discontinue sending UL and/or DL channel condition related information to the base station 126 when instructed to do so by the base station 126, as illustrated in FIG. 7B (discussed below).

As mentioned earlier, the term "wireless device" may primarily refer to an M2M-capable device/sensor, which may include an M2M device or gateway and may also include M2M-enabled UEs, mobile handsets, or other wireless terminals that are capable of voice and/or data communication via a carrier network (such as the network 124). However, as also mentioned earlier, in particular embodiments, the term "wireless device" may also include non-M2M terminals (i.e., wireless terminals that may not be capable of or configured for M2M communication) for which signaling overhead reduction according to the teachings of the present disclosure may still be desirable. Because examples of different types of "wireless devices" are already provided earlier under the "Background" section, such examples are not repeated herein for the sake or brevity.

In the discussion herein, the terms "wireless network," "mobile communication network," or "carrier network" may be used interchangeably to refer to a wireless communication network (e.g., a cellular network, a proprietary data communication network, a corporate-wide wireless network, etc.) facilitating voice and/or data communication with wireless devices (like the device 122). The wireless network 124 may be a dense network with a large number of wireless terminals (e.g., a large number of UE's along with a large number of sensors or wireless devices 122) operating therein. As mentioned earlier, the discussion herein relates to wireless devices 122 that are primarily stationary. However, it is understood that the carrier network 124 may support stationary as well as mobile devices.

In one embodiment, the wireless device 122 may be a simple terminal with limited processing capability. (Exemplary architectural details for such a wireless device are given in FIG. 15 and discussed below.) For example, the device 122 may be a sensor (e.g., a wireless picture or video camera installed at a corporate warehouse) for various machine-to-machine applications that send data to a base station, or a sensor attached to a home electrical meter to wirelessly report the meter reading to an eNodeB, or a sensor placed on ground (e.g., for monitoring and wirelessly reporting seismic activity) and communicating with a stationary or mobile (e.g., on an airplane) base station, etc. Such terminals may be small and cheap, with a single antenna (for transmission as well as reception). However, as mentioned earlier, the teachings of the present disclosure (related to scheduling-related signaling overhead reduction) may also be used in conjunction with other more-sophisticated mobile handsets (whether enabled for M2M communication or not) such as, for example, modern cellular telephones, UEs or data transfer equipments (e.g., a Personal Digital Assistant (PDA) or a pager), smartphones (e.g., iPhone™, Android™, Blackberry™, etc.), computers, or any other type of user devices that are configured to operate in a wireless environment in a primarily stationary manner.

Although the wireless device 122 may be generally functionally similar to some of the wireless devices 18-30 shown in FIG. 1, it can be distinguished from the wireless devices 18-30 in the sense that wireless device 122 in FIG. 6 is capable of supporting the scheduling-related signaling overhead reduction methodology according to particular embodiments of the present disclosure, whereas existing devices 18-30 may not provide such support without suitable modifications according to the teachings of the present disclosure. Thus, although general details of the device 122 are not provided in any appreciable detail herein because of the detailed discussion of devices 18-30 in FIG. 1, specific details or functionalities of the device 122 that may be needed to support the methodology of the present disclosure are however discussed at length below.

The carrier network 124 may include a network controller 129 coupled to the base station 126 and providing logical and control functions (e.g., terminal mobility management, access to external networks or communication entities, subscriber account management, etc.) in the network 124. In case of an LTE carrier network, the network controller 129 may be a Core Network (CN), which may be an Access Gateway (AGW). Regardless of the type of carrier network 124, the network controller 129 may function to provide connection of the base station 126 to other terminals (not shown) operating in the carrier network 124 and also to other communication devices (e.g., wireline or wireless phones, computers, monitoring units, etc.) or resources (e.g., an Internet website) in other voice and/or data networks (not shown) external to the carrier network 124. In that regard, the network controller 129 may be coupled to a packet-switched network (e.g., an Internet Protocol (IP) network 130, such as the Internet) as well as a circuit-switched network 132, such as the Public-Switched Telephone Network (PSTN), to accomplish the desired connections beyond the carrier network 124.

The carrier network 124 may be a cellular telephone network, a Public Land Mobile Network (PLMN), or a non-cellular wireless network (whether voice network, data network, or both). The wireless device 122 may be a subscriber unit in the carrier network 124. Furthermore, portions of the carrier network 124 may include, independently or in combination, any of the present or future wireline or wireless communication networks such as, for example, the PSTN, an IP Multimedia Subsystem (IMS) based network, or a satellite-based communication link. Similarly, as also mentioned above, the carrier network 124 may be connected to the Internet via its network controller's 129 connection to the IP network 130 or may include a portion of the Internet as part thereof. In one embodiment, the wireless network 124 may include more or less or different type of functional entities than those shown in the context of the carrier network 124 in FIG. 6.

Although various examples in the discussion below are provided primarily in the context of the wireless network 124 being an IP-based 3GPP/3GPP2 cellular network (e.g., an LTE or UMTS network), the teachings of the present disclosure may equally apply, with suitable modifications, to a number of different Frequency Division Multiplex (FDM) and Time Division Multiplex (TDM) based cellular wireless systems or networks (as well as FDD and TDD wireless systems/networks) where radio resources are "scheduled" to a wireless terminal by a network-based entity. Such cellular networks or systems may include, for example, standard-based systems/networks using Second Generation (2G), 3G, or Fourth Generation (4G) specifications, or non-standard based systems. Some examples of such systems or networks include, but not limited to, GSM networks, GPRS networks, Telecommunications Industry Association/Electronic Industries Alliance (TIA/EIA) Interim Standard-136 (IS-136) based Time Division Multiple Access (TDMA) systems, WCDMA systems, WCDMA-based HSPA systems, 3GPP2's CDMA based High Rate Packet Data (HRPD) or evolved HRPD (eHRPD) systems, CDMA2000 or TIA/EIA IS-2000 systems, Evolution-Data Optimized (EV-DO) systems, WiMAX systems, International Mobile Telecommunications-Advanced (IMT-Advanced) systems (e.g., LTE Advanced systems), other Universal Terrestrial Radio Access Network (UTRAN) or Evolved UTRAN (E-UTRAN) networks, GSM/EDGE systems, Fixed Access Forum or other IP-based access networks, a non-standard based proprietary corporate wireless network, etc. It is noted that the teachings of the present disclosure are also applicable to FDM variants such as, for example, Filter Bank Modulation option, as well as to multiple access schemes based on spatial division (e.g., Spatial Division Multiple Access (SDMA)).

FIG. 7A is an exemplary flowchart 135 depicting steps that may be performed by a network entity (e.g., the network entity 126 in FIG. 6) according to the teachings of one embodiment of the present disclosure. As shown in FIG. 6 and indicated at block 136 in FIG. 7A, the wireless device 122 may be in wireless communication with the network entity 126 (which may be an eNodeB) in a mobile communication network (e.g., the carrier network 124) and may receive UL and DL scheduling information from the network entity 126. As noted earlier, the present disclosure relates to a method for reducing signaling overhead related to scheduling of UL and DL radio resources to primarily stationary or static devices in a mobile communication system. When the devices are stationary, significant signaling overhead reduction may be accomplished because the radio environments associated with them are more stable—i.e., radio environments where the channel coefficients are highly correlated over time for the same sub-bands of frequencies. Thus, at block 137, upon detecting that the wireless device 122 is stationary (or substantially non-mobile), the network entity 126 may perform at least one of the following two steps: (1) At block 138, the network entity 126 may statistically analyze DL channel condition related information received from the wireless device 122 over a first predetermined time interval so as to determine the most suitable device-specific DL scheduling resources for the wireless device 122; and (2) at block 139, the network entity 126 may statistically analyze UL channel condition related information received from the wireless device over a second predetermined time interval so as to determine the most suitable device-specific UL scheduling resources for the wireless device 122.

As mentioned earlier, whether a wireless device is primarily stationary or not may be determined using the approaches discussed in Reference-1 and Reference-2, the disclosures of which are incorporated herein by reference in their entireties. As also mentioned earlier, many other techniques can be found in the related art and can be used instead as well.

Referring now to block 140 in FIG. 7A, upon conclusion of statistical analysis at blocks 138 and/or 139, the network entity 126 may instruct the wireless device to perform at least one of the following: (1) Stop reporting DL channel condition related information to the network entity until further notice (block 141); and (2) stop reporting UL channel condition related information to the network entity until further notice (block 142). In this manner and as discussed in further detail below, significant reduction in scheduling-related signaling overhead may be achieved using statistical analysis-based control of a device's reporting of channel condition related information.

FIG. 7B is another exemplary flowchart 145 depicting steps that may be performed by a wireless device (e.g., the wireless device 122 in FIG. 6) according to the teachings of one embodiment of the present disclosure. Block 147 in FIG. 7B is similar to block 136 in FIG. 7A, both of which indicate that the wireless device 122 may be in wireless communication with the network entity 126 (which may be a serving eNodeB) in a mobile communication network (e.g., the carrier network 124) and may receive UL and DL scheduling information from the network entity 126. As part of maintaining communication or radio interface with the network entity 126, the wireless device 122 may report either DL channel condition related information or UL channel condition related information, or both, to the network entity 126, as indicated at block 148. In particular embodiments, the wireless device 122 may be required to (or scheduled to) report such information periodically, aperiodically, or in a semi-persistent manner, as discussed earlier. During its continued interface with the network entity 126, the wireless device 122 may monitor a DL control channel (e.g., the PDCCH, as mentioned earlier and also discussed below) that provides UL and DL scheduling information from the network entity 126 (block 149 in FIG. 7B). During its monitoring of the DL control channel, the wireless device 122 may identify whether the DL control channel includes a device-specific first indicator with a first predetermined value (block 150 in FIG. 7B) and/or a device-specific second indicator with a second predetermined value (block 151 in FIG. 7B). In one embodiment, each indicator may be transmitted on different downlink PDCCH. Alternatively, each indicator value may be transmitted on or conveyed through the same PDCCH. For example, in 3GPP Rel-11, UL and DL are separated via the Downlink Control Information (DCI) format used for PDCCH. Thus, for example, at a given TTI, DCI formats 0, 3, and 4 (and, possibly, the variant 3A) may be used for UL, and the DCI formats 1, 2 (and the variants 1A, 1B, 1C, 1D, 2A, 2B, 2C, and 2D) may be used for DL. In case both UL and DL resources are allocated to a user during a given TTI, then two different DCIs may be used—one per indicator—to transmit the above-mentioned first and second indicators through the same PDCCH. As discussed below, new DCI formats 0A and 0B may be devised to transmit the second indicator (for UL) and the first indicator (for DL), respectively. In one embodiment, also discussed below, a Radio Resource Control (RRC) message Information Element (IE) may be used for both UL- and DL-related indicators.

If the DL control channel does not include either indicator, the wireless device 122 may continue its reporting of DL and/or UL channel condition related information as scheduled. This is indicated by arrows 152 and 153 in FIG. 7B. However, if the DL control channel includes the first indicator, the wireless device 122 may discontinue the reporting of DL channel condition related information to the network entity 126 when the device 122 receives the first indicator with the first predetermined value, as shown at block 154 in FIG. 7B. Similarly, if the DL control channel includes the second indicator, the wireless device 122 may discontinue the reporting of UL channel condition related information to the network entity 126 when the device 122 receives the second indicator with the second predetermined value, as shown at block 155 in FIG. 7B.

It is noted here that in FIGS. 7A and 7B (and also in the discussion herein), the term "DL channel condition related information" may refer to a DL channel status report consisting of one or several pieces of information such as, for example, an estimation of complex channel values (e.g., earlier-mentioned RI, PMI, channel coefficients, etc.) per sub-band over a predetermined number of frequency sub-bands associated with a DL Reference Signal (RS) sent by the network entity 126 and received by the wireless device 122 over the wireless communication channel 128, a distribution of CQI for the wireless communication channel 128 over a predetermined number of frequency sub-bands associated with the DL reference signal, etc. On the other hand, the term "UL channel condition related information" may refer to one or more Sounding Reference Signals (SRS) sent from the wireless device 122 to the network entity 126 over the communication channel 128. In the highest granularity case, a sub-band may be a scheduling unit (e.g., a single Resource Block (RB) in case of an LTE system). This granularity is usually configurable (e.g., by the network entity 126) and may be informed to the device 122 via a DL control channel (e.g., the PDCCH). As mentioned earlier, as an alternative to per sub-band reporting, the device 122 may be instructed by the network entity 126 to provide wideband reports, reflecting the status of the channel 128 over the entire cell bandwidths.

Figure 8:
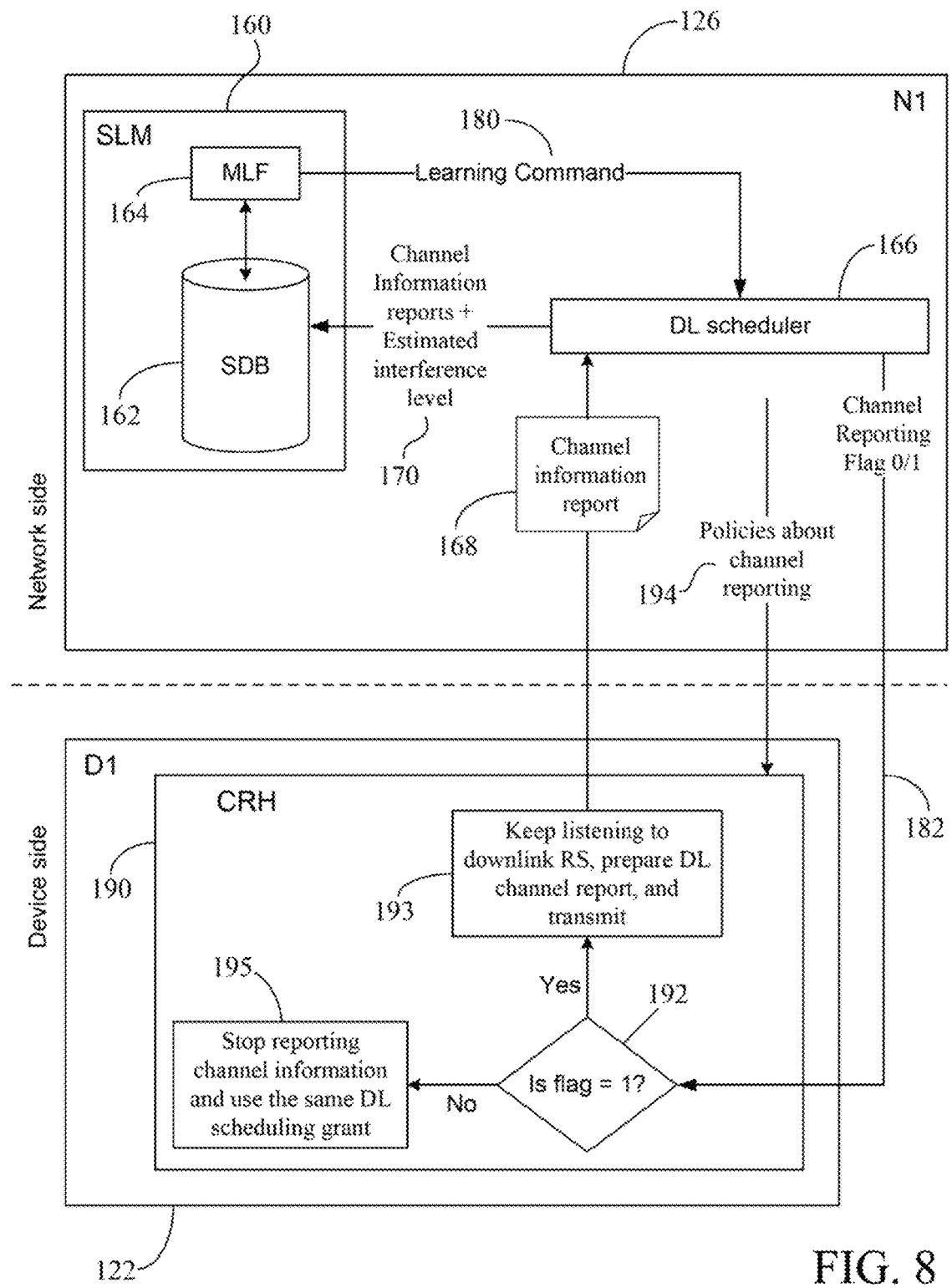
FIG. 8 illustrates exemplary architectural details of a network entity and a wireless device to implement the signaling overhead reduction methodology in the downlink according to the teachings of one embodiment of the present disclosure.

FIG. 8 illustrates exemplary architectural details of a network entity (e.g., the network entity 126) and a wireless device (e.g., the wireless device 122) to implement the signaling overhead reduction methodology in the downlink (DL) according to the teachings of one embodiment of the present disclosure. In the discussion of FIGS. 8-14, the network entity 126 may be referred to as entity "N1" (to distinguish it from entity "N2" discussed later with reference to FIG. 9), and the wireless device 122 may be referred to as device "D1" (to distinguish it from another device "D2" discussed later with reference to FIG. 9).

Figure 4:
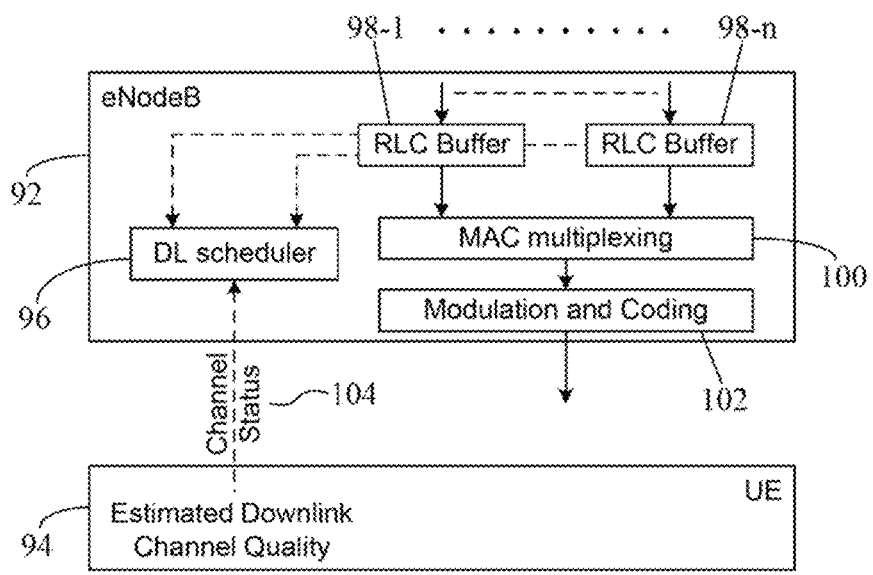
FIG. 4 shows an exemplary operational arrangement for an LTE downlink scheduler.

In one embodiment, the network entity (N1) 126 may comprise a Self-Learning Module (SLM) 160 with a Stationary Device Database (SDB) 162 and a Machine Learning Function (MLF) 164. The SLM 160 may have a logical connection to both the downlink and uplink schedulers in the network entity 126. An exemplary DL scheduler 166 is shown in FIG. 8 (and corresponding UL scheduler is discussed later with reference to FIGS. 12-13). Functionalities similar between the DL scheduler 166 and the earlier-discussed DL scheduler 96 (FIG. 4) are not repeated herein in any appreciable detail for the sake of brevity. In one embodiment, the SLM 160 may be a software module containing program code that may be executed by one or more processors (e.g., the processing unit 237 in FIG. 16) in the network entity 126 to enable the network entity to perform various functions associated with the SLM 160, as discussed below. In another embodiment, the contents of the SDB 162 may be stored along with the program code for the SLM 160 (e.g., as part of a processor's internal memory) or at a different location in another memory (e.g., the memory 240 in FIG. 16) in the network entity 126. The MLF 164 may access the SDB 162 for relevant information, as discussed below.

The SDB 162 can get (and store) information on the lack of movement of several devices operating within the cell site (e.g., the cell site 172 in FIG. 9) under the radio coverage of the network entity 126. In other words, the SDB 162 can store unique identity of each device served by the network entity 126 and determined to be primarily stationary (or substantially non-mobile). Either the network (e.g., the network entity 126, or an UL or DL scheduler in the entity 126, or another element in the CN 129, etc.) or the terminal/device 122 can detect that the terminal/device 122 is stationary using, for example, the approaches discussed in Reference-1 and Reference-2, the disclosures of which are incorporated herein by reference in their entireties.

In one embodiment, the downlink scheduler 166 may receive downlink channel information reports (i.e., channel status reports containing DL channel condition related information) 168 from the static device D1 (e.g., via an uplink control channel such as the PUCCH or PUSCH) and it may store these reports at the SDB associated with a unique identity for D1 along with other relevant information about the network state at the moment the report was received, as identified by reference numeral "170" in FIG. 8. Such network state related information may include, for example, the current downlink load, a time stamp, and the estimated interference level.

FIG. 9 depicts an example of how interference estimation may be performed by a network entity (e.g., the entity 126). As shown in FIG. 9, there may be many wireless devices (including the wireless device D1) operating within the cell site 172 under the radio coverage of entity N1. Many wireless devices (like the device "D2" identified by reference numeral "174") may fall under the radio coverage of the entity N1 only. However, the device D1 may be positioned at an overlap between cell site 172 and a second cell cite 175 under the radio coverage of another network entity N2 (identified by reference numeral "176"). (Both cell cites 172, 175 are shown by dotted ovals in FIG. 9.) In that case, device D1 may experience radio signal interference (as indicated by arrow 177) from the adjacent or neighbor cell 175 of the entity 176. Device D1 may report such interference to its serving node 126 as part of its channel status report 168 (as indicated by arrow 178), which may be analyzed by the network entity 126 to estimate the interference level. In one embodiment, the network entity 126 may estimate neighbor cell or other type of interference from event-triggered or periodic measurement reports sent from the device 122 to the entity 126.

As mentioned earlier, the channel information conveyed by D1 through its channel reports 168 may be the estimated complex channel values per sub-band or some discrete information (such as the CQI distribution for a set of K sub-bands). In the highest granularity case, the sub-band may be a scheduling unit (e.g., an RB). This granularity is usually configurable and informed to the devices (e.g., by the entity N1) via a downlink control channel (e.g., the PDCCH). It is assumed here that the downlink scheduler 166 "knows" (e.g., through detection by the network or the terminal/device using one of the approaches in Reference-1 or Reference-2, as mentioned earlier) that D1 is a static device, when it receives the channel reports 168 from D1.

Referring again to FIG. 8, the MLF 164 at the SLM 160 may constantly monitor the updates performed by the downlink scheduler 166 at the SDB 162, and may run a machine learning algorithm during a "training period," which, in one embodiment, could be measured in terms of time period to receive a predetermined number of channel status reports from the same static device D1. For example, in one embodiment, the training period may extend for a time duration equal to fifty successive DL channel status reports received from device D1. This training period may be configurable (e.g., by the SLM 160) as desired. For example, if the current training period may not result in collection of statistically useful data, then that training period may be extended until MLF 164 determines that the collected data is statistically significant to enable MLF 164 to generate a Learning Command (discussed later). In one embodiment, the DL scheduler 166 may adaptively vary DL scheduling grants during the "training period" to obtain DL channel status reports from the device 122 during different radio conditions (e.g., during different times of the day, during different network load levels or interference levels, etc.), so as enable the MLF 164 to more accurately estimate what could be the most suitable future DL scheduling resources for the wireless device 122 in case of absence of further DL channel condition related information from the device 122.

During the training period, the MLF 164 may statistically analyze channel status reports and other relevant information associated with them, so as to "learn" what could be "optimum" DL scheduling resources for the device 122. When this training period is over, the MLF 164 may send a learning command to the downlink scheduler 166 as indicated by arrow 180 in FIG. 8. In one embodiment, the learning command (which is discussed later in more detail with reference to FIG. 11) may contain, partially or fully, the following information: (1) The most suitable device-specific DL scheduling units (e.g., sub-bands) for device D1, in the order of priority, for different interference levels (e.g., low, medium, high), and/or time periods, and/or network load levels; (2) Processed statistics about the DL channel information for D1 (e.g., auto-correlation over different channel status reports, average and/or standard deviation of various device-measured DL channel status data, etc.); and (3) A single flag informing that DL scheduling knowledge is available for D1.

Upon the reception of this learning command, the downlink scheduler 166 may send a flag bit (e.g., via PDCCH, or via any other control channel that may be eventually specified in the future for the purpose of conveying scheduling grants) to the stationary device D1 (as indicated by arrow 182 in FIG. 8) to configure it to stop reporting downlink channel condition related information. The same flag bit indicating the device D1 to stop reporting channel information may replace the downlink scheduling grant, thereby indicating that the device D1 must use the same DL radio resources (e.g., the DL radio resources that were scheduled immediately prior to receiving the flag bit from the scheduler 166) as long as the flag bit remains the same. Once the device D1 is instructed of such continued use of the same DL radio resources, there may not be any need for the device D1 to prepare and report additional channel condition related information to make the entity N1 "aware" of the DL channel condition. This represents a reduced overhead over the uplink control channel (e.g., PUCCH) and, consequently, reduced battery consumption for the device D1 as compared to the current legacy systems.

It is observed here that, in one embodiment, immediately prior to sending the flag bit to D1 (instructing D1 to stop reporting DL channel condition related information), the DL scheduler 166 may send the earlier-determined "optimum" DL scheduling grant (e.g., by MLF 164) to device D1. Hence, when the flag bit later arrives at D1, the device already "knows" which DL scheduling grant to keep using until further notice from the scheduler 166 (e.g., through a different value of the flag bit sent to the device D1 to instruct it to now start reporting DL channel condition related information).

FIG. 10 pictorially illustrates the basic methodology of DL scheduling-related signaling overhead reduction according to one embodiment of the present disclosure. As discussed earlier and as shown by dotted block 184 in FIG. 10, the "training period" (step 1 in FIG. 10) may include the time duration associated with a predetermined number (which may be configurable by the SLM 160 or other unit in the network entity 126) of DL Reference Signals (RS) and corresponding DL channel status reports from device D1. Once the training period is over and once the DL scheduler 166 receives the learning command (from the MLF 164), the network entity N1 may send a flag bit (e.g., as shown at arrow 182 in FIG. 8) to instruct the device 122 to stop sending channel reports to the entity N1 until further notice (e.g., until a different value of the flag bit is received by the device D1 from the entity N1). This action from the network entity 126 is illustrated by step 2 (arrow 185) in FIG. 10. In view of earlier discussion of FIGS. 8 and 9, additional discussion of FIG. 10 is not provided for brevity.

Figures 11, 13, 14:
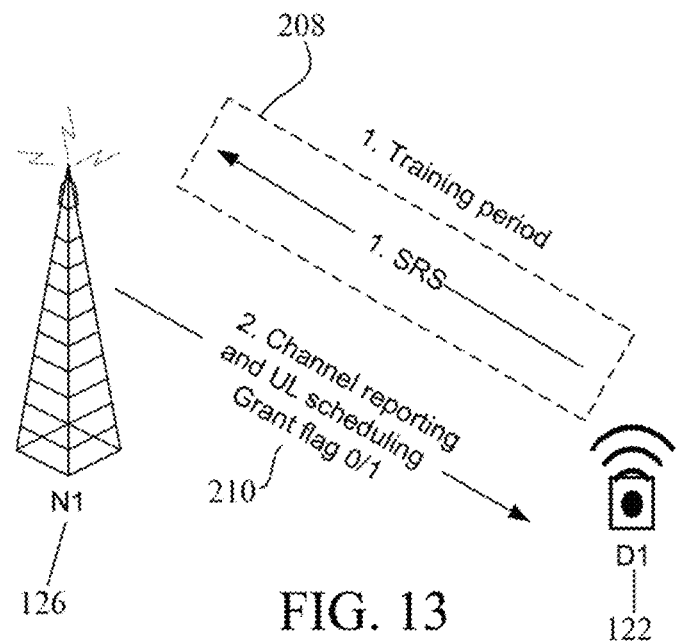
FIG. 11 shows format of an exemplary learning command that may be sent to a DL scheduler according to one embodiment of the present disclosure.
FIG. 13 is a counterpart of FIG. 10 and pictorially illustrates the basic methodology of UL scheduling-related signaling overhead reduction according to one embodiment of the present disclosure.
FIG. 14 is a simplified illustration of transmission of PDCCH from the network entity N1 to the wireless device D1, wherein the PDCCH includes the new DCI Format 0A according to one embodiment of the present disclosure.

FIG. 11 shows format of an exemplary learning command 188 that may be sent to a DL scheduler (e.g., the scheduler 166 in FIG. 8) according to one embodiment of the present disclosure. As noted before, the learning command 188 may contain processed statistics about the channel information for D1 and may be sent by the MLF 164 to the scheduler 166 after MLF's "training period" (for machine learning) is over. Although the exemplary learning command 188 in FIG. 11 is in the context of an LTE system, similar learning commands may be generated in other non-LTE systems as well. As shown in FIG. 11, in one embodiment, the DL Received Signal Strength (RSS) may be estimated (in decibel milliwatt or dBm) by the MLF 164 for all the Physical Resource Blocks (PRBs) in a radio frame of 10 ms. As is known, there may be twenty PRBs or "slots" (each of 0.5 ms duration) in a 10 ms radio frame in LTE—two slots per radio sub-frame of 1 ms. Five PRBs (numbered 0, 1, 2, 3, and 4) are shown in FIG. 11 along with corresponding values for various parameters estimated by the MLF 164. One of such parameters includes, for example, the earlier-mentioned DL RSS (in dBm), which may be estimated assuming the same transmitted power (by the network entity 126) for each PRB. In the example of FIG. 11, the interference (whether from adjacent cell or some other source) is assumed to be "low" for all measurements/estimations. The other parameters that may be reported as part of the learning command 188 include, for example, the DL Signal to Interference-plus-Noise Ratio (SINR) (in decibel or dB), DL SINR autocorrelation values (e.g., over different channel status reports from D1), and DL RSS autocorrelation values (e.g., also over different channel status reports from D1). The value "e" in the learning command 188 in FIG. 11 refers to the mathematical constant "e" which is the base of natural logarithm. As noted in FIG. 11, the DL SINR may approximate CQI values received from the device D1.

As mentioned earlier, the learning command 188 may also include a single flag informing the DL scheduler 166 that scheduling knowledge is available for D1. In FIG. 11, such a flag is represented by value "1" for each PRB (as can be seen from the bottom row of the table in FIG. 11). In one embodiment, if the flag value is "0", then it may indicate to the scheduler 166 that sufficient scheduling knowledge is not yet available for D1 for the corresponding PRB(s). In that case, the scheduler 166 may not send the channel reporting flag bit (at arrow 182 in FIG. 8) to D1. Furthermore, in such a case in one embodiment, the SLM 160 may extend the "training period" until statistically-significant data are collected.

Referring again to FIG. 8, in one embodiment, the stationary device D1 may include a Channel Reporting Handler (CRH) 190. The CRH may be a software module containing program code that may be executed by a processor (e.g., the processor 220 in FIG. 15) in the wireless device 122 to enable the device to perform various functions associated with the CRH module 190, as discussed herein. In one embodiment, the CRH 190 at D1 may listen to a downlink control channel (e.g., PDCCH) in order to identify the binary flag bit sent from the downlink scheduler 166 (at arrow 182 in FIG. 8). In the case of a positive flag bit (i.e., the flag bit having the value "1"), the CRH 190 may continue to prepare and transmit DL channel reports (or enable/disable another module which does this) by, e.g., continuing to listen to the downlink Reference Signals (RS) in the K configured sub-bands over the downlink control channel (e.g., PDCCH) and by estimating the channel quality over these sub-bands—each sub-band can be, in the highest granularity case, a scheduling unit or RB as mentioned before. This reporting aspect is illustrated by blocks 192 and 193 in FIG. 8. In the case of a positive flag (i.e., flag bit=1), the CRH 190 may also transmit DL channel reports (or DL channel condition related information) accordingly to policies received from some unit at the network side, as indicated by arrow 194 in FIG. 8. Such unit may be, for example, the downlink scheduler 166, which can send to D1 the policy about channel reporting via RRC signaling. This policy may inform the device D1 whether the reports should be periodic (and which period) or aperiodic, which sub-bands should be reported, etc.

Alternatively, in the case of a negative flag bit (i.e., when the flag bit at arrow 182 has the value "0"), the CRH 190 may stop listening to the classical DCI formats of DL control channel, or even stop listening to existing DL control channel (e.g., PDCCH) and stop preparing channel information reports, as illustrated by blocks 192 and 195 in FIG. 8. In such a case, the device D1 may instead listen to below-discussed one or more new DCI format(s) of 1 bit (e.g., as shown in FIG. 14). This information—i.e., new DCI format(s) according to one embodiment of the present disclosure—can be conveyed either via existing DL control channels, such as PDCCH, or via new appropriately-defined DL control channel(s). Upon receiving the negative flag bit (i.e., flag bit=0), the CRH module 190 may also assume that the DL scheduler 166 requires D1 to keep using the same downlink scheduling grant which is currently being used. In that case, D1 may continue to use the same DL scheduling grant until further notice from the network entity 126 (e.g., in the form of a new flag bit from the scheduler 166 with the value "1").

Figure 12:
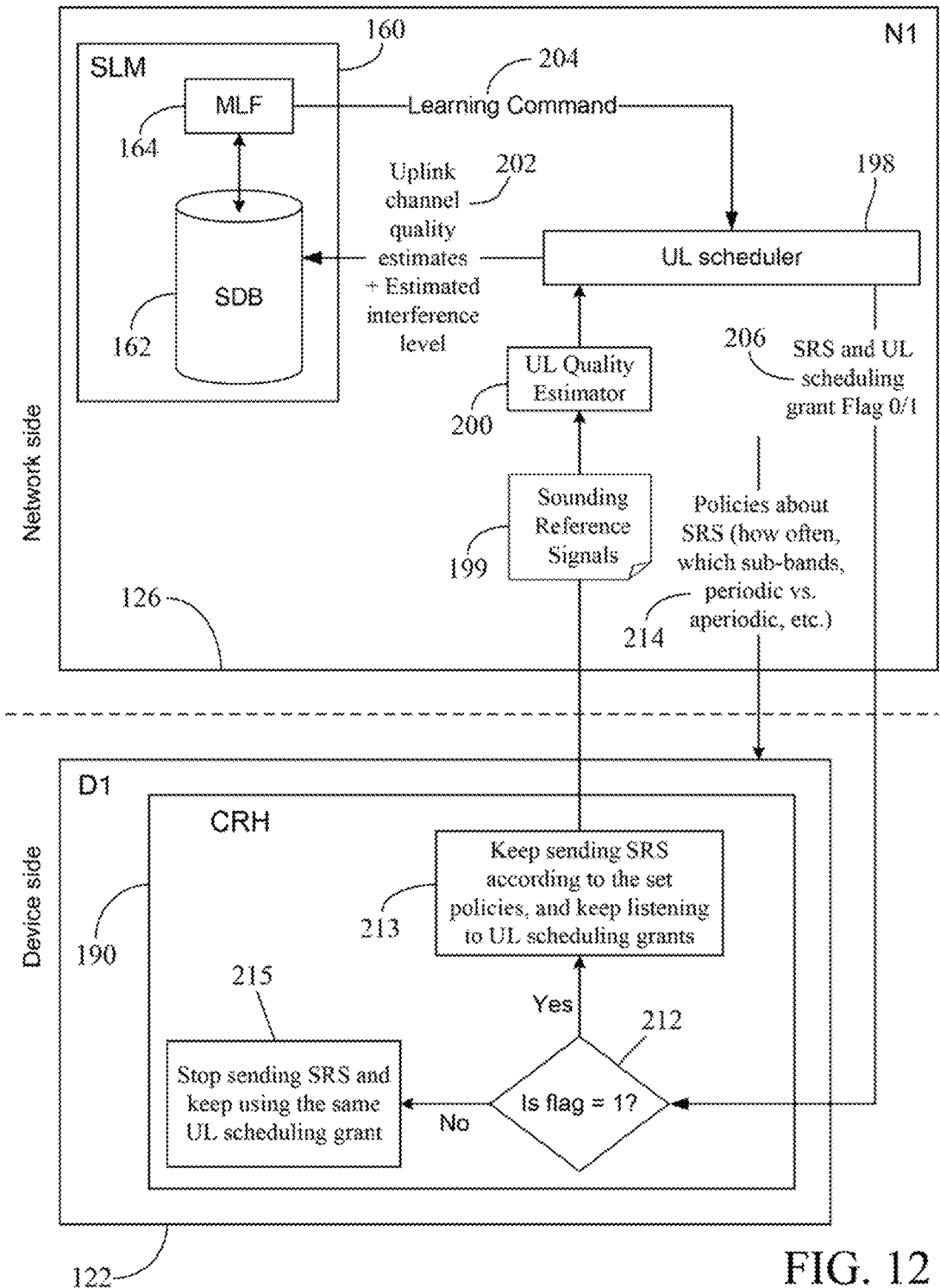
FIG. 12 is a counterpart of FIG. 8 and illustrates exemplary architectural details to implement the signaling overhead reduction methodology in the uplink according to the teachings of one embodiment of the present disclosure.

FIG. 12 is a counterpart of FIG. 8 and illustrates exemplary architectural details to implement the signaling overhead reduction methodology in the uplink (UL) according to the teachings of one embodiment of the present disclosure. For ease of discussion and reference, common elements in FIGS. 8 and 12 (e.g., the SLM, the MLF, the CRH, etc.) are identified using the same reference numerals. In view of extensive discussion of FIG. 8, a detailed discussion of such common elements is not repeated herein for the sake of brevity. Furthermore, because of the earlier detailed discussion of FIGS. 8 and 10, only a brief discussion of FIGS. 12 and 13 (which is the counterpart of FIG. 10) is provided below to highlight various UL-specific aspects associated with FIGS. 12-13.

As shown in FIG. 12, the network entity 126 may comprise an uplink scheduler 198. Functionalities similar between the UL scheduler 198 and the earlier-discussed UL scheduler 106 (FIG. 5) are not repeated herein in any appreciable detail for the sake of brevity. In one embodiment, the uplink scheduler 198 may estimate the uplink channel quality based on the SRS signals sent by the static device D1 (as indicated by blocks 199 and 200 in FIG. 12) and store these estimates of uplink channel quality at the SDB 162 associated with the unique identity for D01, along with other relevant information (as indicated by the reference numeral "202" in FIG. 12). For example, the UL scheduler 198 may correlate the estimated UL channel information with other relevant information about the network state at the moment the channel information was estimated, such as, for example, the current uplink load, a time stamp, and the estimated interference level at the uplink. The correlated information then may be stored along with the estimated UL channel quality as indicated at arrow 202 in FIG. 12. In one embodiment, the estimated uplink channel quality may include, for example, the estimated complex channel values per sub-band or scheduling unit, or some discrete information (such as the CQI distribution) for a set of K configured sub-bands, where, in the highest granularity case, the sub-band may be a scheduling unit (e.g., a resource block in the case of LTE). This granularity is usually configurable and informed to the devices (e.g., by the entity N1) via a downlink control channel (e.g., the PDCCH). It is assumed here that the UL scheduler 198 "knows" (e.g., through detection by the network or the terminal/device using one of the approaches in Reference-1 or Reference-2, as mentioned earlier) that D1 is a static device, when it receives the channel reports (i.e., the SRS 199) from D1.

Similar to the downlink case, the MLF 164 at the SLM 160 may constantly monitor the updates performed by the uplink scheduler 198 at the SDB 162, and may run a machine learning algorithm during a training period, which, in one embodiment, could be measured in terms of time period to receive a predetermined number of SRS signals from the same static device D1 and, possibly, for different radio conditions (e.g., different interference and load levels, during different periods of the day, etc.), so as to enable the MLF 164 to more accurately estimate what could be the most suitable future UL scheduling resources for the wireless device 122 in case of absence of further UL channel condition related information (e.g., SRS signals) from the device 122. As in case of FIG. 8, this training period for the UL situation in FIG. 12 also may be configurable (e.g., by the SLM 160) as desired. For example, in one embodiment, the training period may extend for a time duration equal to fifty successive SRS signals received from device D1. On the other hand, in one embodiment, if the current training period may not result in collection of statistically useful data, then that training period may be extended until MLF 164 determines that the collected data is statistically significant to enable MLF 164 to generate a Learning Command (indicated at arrow 204 in FIG. 12).

During the training period, the MLF 164 may statistically analyze the estimates of UL channel quality and other relevant information associated with them, so as to "learn" what could be "optimum" UL scheduling resources for the device 122. When this training period is over, the MLF 164 may send a learning command to the UL scheduler 198 as indicated by arrow 204 in FIG. 12. Although not shown, it is noted that a learning command similar to the DL-related learning command 188 in FIG. 11 may be generated in this UL case as well. In one embodiment, this UL learning command 204 may contain, partially or fully, the following information: (1) The most suitable device-specific uplink scheduling units (e.g., sub-bands) for device D1, in the order of priority, for different interference levels (e.g., low, medium, high), and/or time periods, and/or network load levels; (2) Processed statistics about the UL channel information for D1 (e.g., auto-correlation over different estimations of UL channel condition, average and/or standard deviation of estimated values and other associated data, etc.); and (3) A flag informing that UL scheduling knowledge is available for D1.

Upon the reception of this learning command, the uplink scheduler 198 may send a flag bit (e.g., via PDCCH as discussed later below) to the static device D1 (as indicated by arrow 206 in FIG. 12) to configure it to stop reporting SRS. As discussed in more detail below with reference to FIG. 14, in one embodiment, this can be done by adding an information bit in PDCCH indicating this "stop reporting" option, or by using a specifically defined RRC message, or by defining a new control channel for this purpose.

Upon receiving the flag bit, the device D1 may stop sending SRS signals until further notice (e.g., as long as the value of that flag bit remains the same). The same flag bit indicating the device D1 to stop reporting SRS may replace the uplink scheduling grant, thereby indicating that the device D1 must use the same UL radio resources (e.g., the UL radio resources that were scheduled immediately prior to receiving the flag bit from the scheduler 198) as long as the flag bit remains the same. This represents reduced UL signaling and, consequently, reduced battery consumption for the device D1 as compared to the current legacy systems.

FIG. 13 is a counterpart of FIG. 10 and pictorially illustrates the basic methodology of UL scheduling-related signaling overhead reduction according to one embodiment of the present disclosure. As discussed earlier and as shown by dotted block 208 in FIG. 13, the "training period" (step 1 in FIG. 13) may include the time duration associated with a predetermined number (which may be configurable by the SLM 160 or other unit in the network entity 126) of SRS signals from device D1. Once the training period is over and once the UL scheduler 198 receives the learning command (from the MLF 164), the network entity N1 may send a flag bit (e.g., as shown at arrow 206 in FIG. 12) to instruct the device 122 to stop sending additional SRS signals to the entity N1 until further notice (e.g., until a different value of the flag bit is received by the device D1 from the entity N1). This action from the network entity 126 is illustrated by step 2 (arrow 210) in FIG. 13. In view of earlier discussion of FIG. 12, additional discussion of FIG. 13 is not provided for brevity.

In one embodiment, the CRH 190 at D1 may listen to a downlink control channel (e.g., PDCCH) in order to identify the binary flag bit sent from the uplink scheduler 198 (at arrow 206 in FIG. 12). In the case of a positive flag bit (i.e., the flag bit having the value "1"), the CRH 190 may continue to "listen" to UL scheduling grants and may continue to send SRS over the uplink channel (or enable/disable another module which does this). This continued-sending of SRS is illustrated by blocks 212 and 213 in FIG. 12. In the case of a positive flag (i.e., flag bit=1), the CRH 190 may also transmit SRS (i.e., UL channel condition related information) accordingly to policies received from some unit at the network side, as indicated by arrow 214 in FIG. 12. Such unit may be, for example, the uplink scheduler 198, which can send to D1 the policy about SRS via RRC signaling. This policy may inform the device D1 whether SRS should be periodic (and which period) or aperiodic, which subbands to use to transmit the SRS, etc.

Alternatively, in the case of a negative flag bit (i.e., when the flag bit at arrow 206 has the value "0"), the CRH 190 may stop listening to the DL control channel (e.g., PDCCH) and stop sending any further SRS, as illustrated by blocks 212 and 215 in FIG. 12. Upon receiving the negative flag bit (i.e., flag bit=0), the CRH module 190 may also assume that the UL scheduler 198 requires D1 to keep using the same uplink scheduling grant which is currently being used. In that case, D1 may continue to use the same UL scheduling grant until further notice from the network entity 126 (e.g., in the form of a new flag bit from the scheduler 198 with the value "1").

It is noted here that the steps/actions at block 195 (in FIG. 8) and block 215 (in FIG. 12) do not mean that there is a constant UL/DL resource allocation to device D1. Rather, these blocks 195, 215 illustrate that the same UL or DL resources—which the MLF 164 indicated as the optimal one—should be allocated to D1 when UL or DL traffic arrives and resources are granted to this D1. Therefore, there is a need for D1 to continue to listen to PDCCH or any other new control channel (some examples of which are discussed below) that may be defined to implement the teachings of the present disclosure.

In one embodiment, as mentioned earlier, the uplink scheduler 198 may send a flag bit to the static device D1 (as indicated by arrow 206 in FIG. 12) in a number of ways. For example, the flag bit can be sent by adding an information bit in PDCCH indicating this "stop reporting" option, as discussed below. Alternatively, the flag bit may be sent using a specifically defined RRC message (as also discussed below), or by using a new layer 1 control channel appropriately defined for this purpose.

In case this modification is done at PDCCH level, then, it may be done by adding the flag bit into existing Downlink Control Information (DCI) formats for PDCCH. For example, consider the case of uplink allocation. This kind of allocation may be done using DCI Format 0. As it can be seen from Section 5.3.3.1.1 in 3GPP Technical Specification (TS) 36.212, V10.6.0, Release 10 (June 2012), that the DCI Format 0 contains a number of fields such as, for example, the "resource block assignment" field, the "frequency hopping flag" field, the "Modulation and Coding Scheme (MCS)" field, the "New Data Indicator (NDI)" field, etc. In one embodiment, a new, single-bit field may be added to DCI Format 0 to transmit the flag bit (at arrow 206 in FIG. 12 and at arrow 210 in FIG. 13).

It is observed here that, for simple uplink transmissions, the resource allocation type 2 may be used (which may be indicated through the "resource allocation type" field in DCI Format 0). For example, consider that two PRBs are allocated to the sensor D1. In case the uplink traffic pattern of the sensor D1 is not constant (e.g., it exhibits significant variability), then no Semi-Persistent Scheduling (SPS) can be directly applied. In that situation, in subsequent scheduling requests, the network entity N1 may transmit a DCI with a new Format 0A. In one embodiment, the new DCI Format 0A may be defined by removing almost all of the fields of the classical DCI Format 0. In other words, the DCI Format 0A may contain only two bits—(i) the earlier-mentioned single-bit field for the flag bit (at arrows 206 in FIG. 12 or 210 in FIG. 13), and (ii) one bit to indicate the direction (i.e., UL). When the flag bit has appropriate value (e.g., flag bit=0 in case of the embodiments in FIGS. 12-13), it may indicate that exactly the same UL configuration as previously scheduled can be used by the device D1 for the coming UL transmission(s), until intimated otherwise by the network entity N1 (e.g., through reversal of the value of the flag bit). Thus, whenever a device's traffic pattern allows, the new DCI Format 0A may be used (instead of the "lengthy" Format 0) to send the flag bit. The classical DCI Format 0 can still be used (with the earlier-mentioned single-bit field added, if needed) in other traffic patterns.

Thus, for a device with irregular traffic pattern, many of the fields of the classical DCI format 0—such as, for example, the "resource assignment" field, the "frequency hopping" field, the "MSC" field, the "cyclic shift for UL demodulation RS" field, the "request for transmission of aperiodic CQI/CSI report" field, etc., can be removed when transmitting the flag bit according to the teachings of the present disclosure. In case HARQ is also removed from the operation of such sensors (or M2M devices), then probably the fields "new data indicator" and "MCS and redundancy version" (or "HARQ information and redundancy version") also can be removed from DCI format 0. Furthermore, in case new or innovative power control schemes are applied for such sensor communication (e.g., M2M communication environment), then, probably, the Transmit Power Control (TPC) command included in the classical DCI Format 0 can be removed as well.

Like the above-described DCI format 0A for the UL case, in one embodiment, a new DCI format 0B may be defined for the DL case as well. This DCI format 0B may also contain two bits—(i) the earlier-mentioned single-bit field for the flag bit (at arrows 182 in FIG. 8 and 185 in FIG. 10), and (ii) one bit to indicate the direction (i.e., DL). Thus, existing standards may be revised to include these new 2-bit DCI formats—format 0A for UL and format 0B for DL. These formats 0A and 0B are essentially single-bit formats, but may be expanded to 2-bit formats as discussed here to facilitate indication of direction (UL or DL) through the additional bit. As another example of a new format for DL, the classical DCI format 1A may be modified. As is known, DCI format 1A is currently used for allocations in the DL and it is substantially similar to format 0, except that format 1A contains an extra bit to differentiate it from format 0. Thus, current DCI format 1A also may be modified by removing its fields (in a manner similar to that discussed above with reference to classical DCI format 0) and by replacing those fields with a single bit. A second bit may be then added to indicate direction—i.e., DL. Thus, a new 2-bit, direction-specific DCI format may be defined for DL by modifying classical DCI format 1A in this manner. On the other hand, the RRC message IE—i.e., the "RadioResourceConfigDedicated" IE—discussed below may be the same for both UL and DL. As discussed, this RRC message IE may aid semi-persistent scheduling according to one embodiment of the present disclosure.

FIG. 14 is a simplified illustration of transmission of PDCCH from the network entity N1 to the wireless device D1, wherein the PDCCH includes the new DCI Format 0A according to one embodiment of the present disclosure. Because of earlier discussion of FIGS. 12-13 and also the earlier discussion of DCI Format 0A and its contents, additional discussion of FIG. 14 is not provided herein for the sake of brevity. Similarly, additional figures similar to this FIG. 14 and showing earlier-discussed DL-related new DCI Format 0B or modified Format 1A are not shown for the sake of brevity and to avoid undue repetition.

As discussed earlier, in one embodiment, the DCI Formats 0A or 0B may be used when the traffic pattern of the wireless device D1 is not constant. On the other hand, in case the traffic pattern of the sensor D1 is well known and made known to the network (as proposed in Reference-1 and Reference-2 mentioned earlier) and is periodic, or it could be treated as periodic, then semi-persistent scheduling (SPS) can be applied. As is known, SPS may be configured by an RRC message using the RRC Information Element (IE) "RadioResourceConfigDedicated". (See, e.g., section 3.2.2 in 3GPP TS 36.331, V9.5.0 (December 2010).) This "RadioResourceConfigDedicated" IE is contained in various RRC messages such as, for example, the "RRCConnectionSetup" message, the "RRCConnectionConfiguration" message, the "RRCConnectionReconfiguration" message, and the "RRCConnectionReestablishment" message. In one embodiment, the SPS allocation (through the RRC IE "RadioResourceConfigDedicated") may operate exactly in the same way as described in Rel 8-10 of 3GPP LTE or 3GPP E-UTRA, with the only difference that the allocation may be based on the PDCCH Format 0A (or Format 0B), described above. In other words, SPS scheduling may be done in a two-step manner: In step 1, PDCCH may be transmitted with any type of DCI format (e.g., existing DCI formats or the new DCI formats 0A or 0B); and in step 2, RRC Signaling may be used with the "RadioResourceConfigDedicated" IE mentioned above, indicating the semi-persistent nature of allocation. Steps 1 and 2 above may be applied exactly in the same way as described in Rel 8-10 of 3GPP LTE or 3GPP E-UTRA. Hence, in one embodiment, the flag bit may be sent by the network entity N1 via an RRC message as part of SPS allocation, thereby instructing the wireless device D1 to continue to operate in the SPS mode without sending additional uplink SRS signals until further notice.

In case the traffic pattern of the sensor D1 is not known, but the data traffic (e.g., sensor data) arriving at D1 can be buffered at D1 and can be transmitted in a periodic manner (i.e., by periodically transmitting the buffered information), then, the solution with the SPS described above can also be applied for such "periodic" transmissions to notify D1 to continue such periodic transmissions without sending additional SRS signals in the uplink.

As mentioned earlier, the same flag bit (which may be sent, for example, via DCI Format 0A, or an RRC message, or some other way) indicating the device D1 to stop reporting SRS may replace the uplink scheduling grant, thereby indicating that the device D1 must use the same UL radio resources (e.g., the UL radio resources that were scheduled—whether as SPS scheduling or periodic scheduling or some other type of scheduling—immediately prior to receiving the flag bit from the scheduler 198) as long as the flag bit remains the same. This represents reduced UL signaling and, consequently, reduced battery consumption for the device D1 as compared to the current legacy systems.

In a further embodiment, in case of radio links/channels exhibiting Line of Sight (LOS) component, or high Ricean K factor component, then the signaling overhead reduction methods discussed above can be applied with even higher robustness.

It is observed here that based on the numbers listed in the earlier-mentioned section 5.3.3.1.1 of 3GPP TS 36.212, version 10.6.0, and based on rough calculations for DCI Format 0 (which is the "lightest" DCI format in terms of bit size and the most likely one to be used for communication with sensor-type wireless devices discussed here), around 25 bits in DCI Format 0 can be replaced with a single bit as per the teachings of the present disclosure. This is a considerable reduction of signaling overhead only due to PDCCH transmission, without estimating the overhead reduction due to discontinuation of SRS and CQI elimination (and probably UL and DL demodulation RS elimination). As a result, particular embodiments of the present disclosure also allow for some savings in the processing capacity as well as energy consumption within the sensor.

In one embodiment, once the scheduler (e.g., the scheduler 239 in FIG. 16 discussed below) becomes aware of the channel quality of a link in different frequencies, then an almost permanent allocation of the same frequency band to the same sensor can be done using the flag bit-based approach discussed herein with reference to FIGS. 8-14. As a result, repeated scheduling-related signaling can be prevented. The scheduler may do this frequency band selection according to the scheduler's policy (e.g., the best performing frequency channel can be allocated in case the scheduling policy is to maximize the user throughput). In this respect, other scheduling policies would result into other frequency channel allocations.

Figure 15:
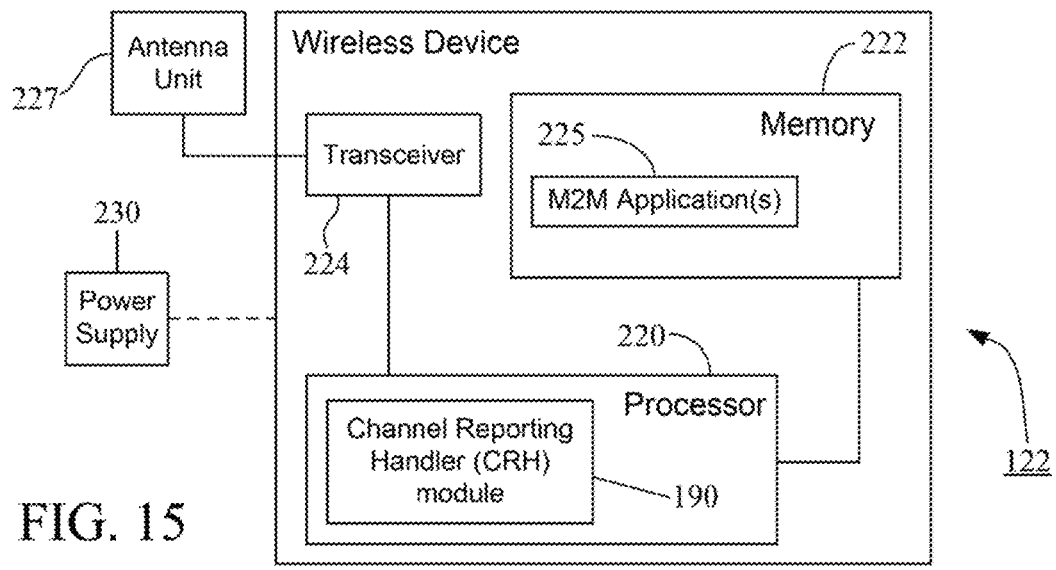
FIG. 15 shows a block diagram of an exemplary wireless device according to one embodiment of the present disclosure.

FIG. 15 shows a block diagram of an exemplary wireless device (e.g., the wireless device 122 in FIG. 6) according to one embodiment of the present disclosure. As noted earlier, the wireless device 122 may be an M2M communication entity (e.g., a sensor, an M2M gateway, an M2M-enabled UE, etc.). The wireless device 122 may include a processor 220, a memory 222 (which may, in some embodiments, also include memory on UE's Subscriber Identity Module (SIM) card), and a transceiver 224. The processor 220 may include the CRH module 190 discussed earlier with reference to FIGS. 8-14. Upon execution of the program code of the CRH module 190 by the processor 220, the processor may configure the wireless device 122 to perform various functions illustrated in FIG. 7B and discussed in more detail with reference to FIGS. 8-14.

When the wireless device 122 is a M2M communication entity, the memory 222 may store device-specific M2M Application(s) (or program code) 225, which may be accessed/executed by the processor 220 as needed to enable the wireless device 122 to provide M2M service(s) (e.g., video surveillance, forestry management, etc.) for which it is designed or configured. Thus, in case of an M2M application, one portion of the application may reside at the M2M service provider's server (like the server 38 shown in FIG. 1, but not shown in FIG. 6), whereas a corresponding "client" portion may reside in the memory 222 as part of M2M application(s) 225. In such a situation, the carrier network 124 may be used as a "transport network" to access the M2M service provider's network (not shown).

The transceiver 224 may communicate with the processor 220 to perform transmission/reception of data, control, or other signaling information (via an antenna unit 227) to/from the network entity 126 in the carrier network 124 with which the wireless device 122 may be in communication (using appropriate 3GPP access such as, for example, eHRPD, UMTS, LTE, etc.). The antenna unit 227 may include one or more antennas. Alternative embodiments of the wireless device 122 may include additional components responsible for providing additional functionality, including any of the functionality identified herein (such as, for example, reporting of UL and DL channel condition related information, processing of flag bits, discontinuation of channel condition reporting, etc.) and/or any functionality necessary to support the solution as per the teachings of the present disclosure. For example, in one embodiment, the wireless device 122 may also include an on-board power supply unit 230 (e.g., a battery or other source of power) to allow the device to be operable in a fixed position over long periods of time and in remote locations.

In one embodiment, the wireless device 122 may be configured (in hardware, via software, or both) to implement device-specific aspects of scheduling-related signaling overhead reduction as per teachings of the present disclosure. For example, when existing hardware architecture of the device 122 cannot be modified, the functionality desired of the device 122 may be obtained through suitable programming of the processor 220. The execution of the program code (by the processor 220) may cause the processor to perform as needed to support the signaling overhead reduction solution as per the teachings of the present disclosure. Thus, although the wireless device 122 may be referred to as "performing," "accomplishing," or "carrying out" (or similar such other terms) a function or process or method step, such performance may be technically accomplished in hardware and/or software as desired. The carrier network operator and/or an M2M service provider or a third party (e.g., manufacturer or supplier of the device 122) may suitably configure the device 122 (e.g., through hardware and/or software based configuration of the processor 220) to operate and reciprocate with the network entity 126 as per the particular requirements discussed above. For example, the device 122 may be configured to stop reporting DL channel condition related information upon receiving the DL flag bit (at arrow 182 in FIG. 8 or arrow 185 in FIG. 10). Similarly, the device 122 may be configured to process an UL flag bit (at arrow 206 in FIG. 12 or arrow 210 in FIG. 13) sent through DCI Format 0A (discussed above) and stop/re-start transmissions of SRS signals as instructed through that flag bit.

Figure 16:
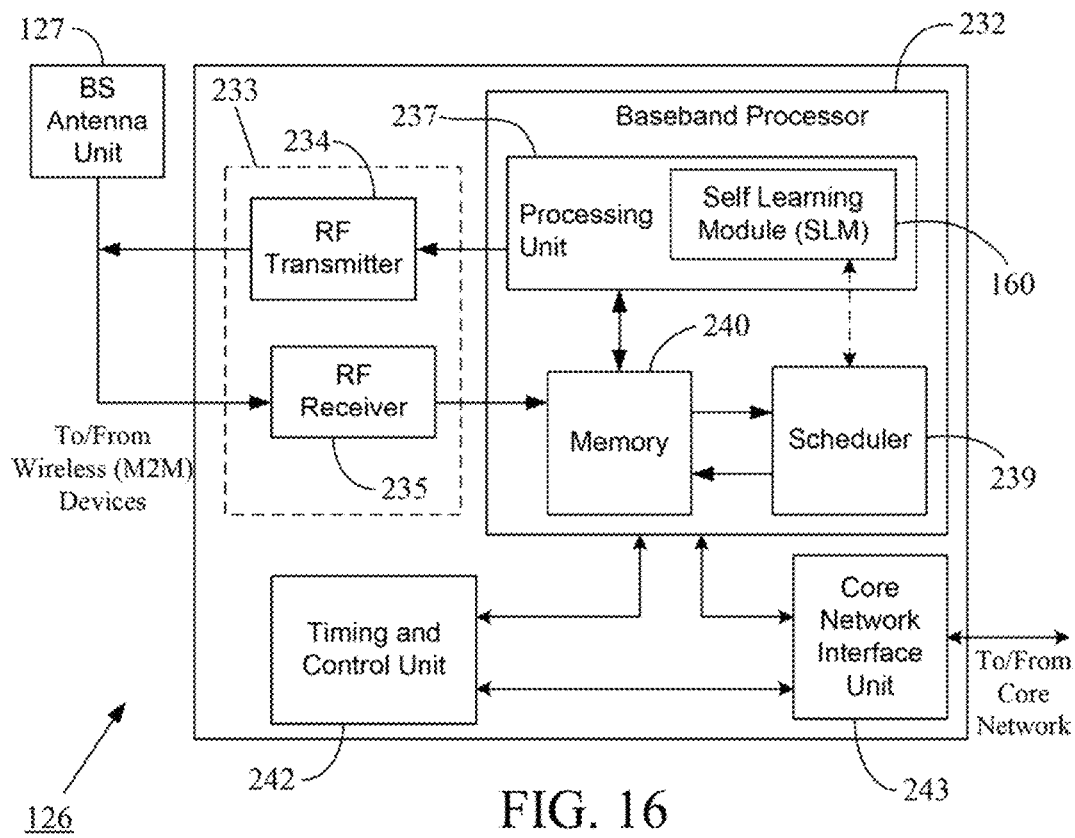
FIG. 16 depicts a block diagram of an exemplary network entity according to one embodiment of the present disclosure.

FIG. 16 depicts a block diagram of an exemplary network entity (e.g., the network entity 126 in FIG. 6) according to one embodiment of the present disclosure. As mentioned earlier, the network entity 126 may be an eNodeB (or eNB) or a similar wireless access node (or base station). The eNodeB 126 may be configured to statistically analyze UL and DL channel condition related information received from a wireless device (e.g., the wireless device 122 in FIG. 15) and then instruct the wireless device 122 to stop reporting such information to the eNB 126 until further notice from the eNB 126, as per the flowcharts in FIGS. 7A-7B. The eNB 126 may include a baseband processor 232 to provide radio interface with the wireless device 122 (in the carrier network 124 in FIG. 6) via eNB's Radio Frequency (RF) transceiver unit 233 coupled to the eNB's antenna unit 127. The transceiver unit 233 may include RF transmitter 234 and RF receiver 235 units coupled to the antenna unit 127 as shown. In one embodiment, the processor 232 may receive transmissions (e.g., UL and/or DL channel condition related information, neighboring cell measurement reports for interference estimation, etc.) from the wireless device 122 via the combination of the antenna unit 127 and the receiver 235, whereas eNB's transmissions (e.g., scheduling instructions, PDCCH signals, UL and/or DL flag bits (for signaling overhead reduction as discussed with reference to FIGS. 8 and 12), etc.) to the wireless device 122 may be carried out via the combination of the antenna unit 127 and the transmitter 234.

The processor 232 may be configured (in hardware and/or software) to perform controlled scheduling of the wireless device 122 as per the teachings of the present disclosure to force the device to stop reporting UL and/or DL channel condition related information so as to reduce scheduling-related signaling overhead as discussed earlier. In that regard, the processor 232 may include a processing unit 237 having the SLM module 160 (shown in FIGS. 8 and 12 as well) coupled to a scheduler 239 to enable the processor 232 to perform various steps illustrated in FIG. 7A and discussed in further detail with reference to FIGS. 8-14. Although not shown in FIG. 16, it is noted here that, in one embodiment, the SLM module 160 may be a separate unit coupled to the processing unit 237, the scheduler 239, and a memory 240 to receive various channel reports from the wireless device 122 and to generate the UL and/or DL related Learning Command as per the teachings of the present disclosure. In another embodiment, various signaling overhead reduction aspects discussed earlier with reference to exemplary FIGS. 7-14 may be implemented using the module 160 in combination with the processing unit 237, the RF transceiver unit 233, the antenna unit 127, the scheduler 239 (discussed later below) and the memory 240 (which may be part of the processor 232 as well). For example, the SDB portion 162 of the module 160 may reside in the memory 240 or may be part of the internal memory of the processing unit 237. In any event, the processing unit 237 may execute the program code for the SLM module 160 to enable the module 160 to receive DL and/or UL channel information reports from the scheduler 239, statistically analyze those reports and other relevant data (which may have been stored in the memory 240), and generate the UL and/or DL related Learning Command for the scheduler 239 as discussed earlier with reference to FIGS. 8 and 12. The SLM module 160 may remain in communication with the processing unit 237 to enable the processing unit 237 to transmit the learning commands to the scheduler 239, which may then send appropriate flag bits to the wireless device 122 (through the transceiver 233 and antenna unit 127 under the control of the baseband processor 232) as per the teachings of the present disclosure. Other arrangements to implement the functionality of the SLM module 160 in the network entity 126 may be devised as well. For example, in one embodiment, when the network entity 126 is a BSC, the functionality of the module 160 may be implemented in such a BSC or a gateway/control node (not shown). Alternatively, all of the functionalities of the module 160 may be performed by the processing unit 237 (e.g., when the module 160 is an integral part of the processing unit 237 as shown, for example, in the embodiment of FIG. 16).

The processing unit 237 may be in communication with the memory 240 to process and store relevant information for the cell (e.g., identities of UEs or wireless devices operating within the cell, channel condition reports and/or neighbor cell measurement reports received from wireless devices, etc.). A scheduler (e.g., the scheduler 239 in FIG. 16) may be part of the eNB's 126 processor 232 and may provide the UL and DL scheduling decisions for the wireless device 122 based on a number of factors such as, for example, QoS (Quality of Service) parameters, device buffer status, UL and DL channel condition related information received from device 122, device capabilities, etc. In the embodiment of FIG. 16, the scheduler 239 may include the functionalities of the individual DL and UL schedulers (i.e., schedulers 166 and 198) shown in FIGS. 8 and 12, respectively. Alternatively, in another embodiment, the network entity 126 may include separate UL and DL schedulers (not shown in FIG. 16) as part of its baseband processor 232. The scheduler 239 may have the same data structure as a typical scheduler in an eNB in an LTE system. The processor 232 may also provide additional baseband signal processing (e.g., mobile/wireless device registration, channel signal information transmission, radio resource management, etc.) as required. The processing unit 237 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. The processor 232 may employ distributed processing in certain embodiments.

Some or all of the functionalities described above (e.g., reception of UL and DL channel condition related information from the device 122, statistical (machine-learning based) analysis of such information, generation of learning commands, transmission of scheduling information and flag bits to the device 122, etc.) as being provided by an eNodeB or another network entity having similar functionality (such as a wireless access node/point, a mobile base station, a base station controller, and/or any other type of mobile communications node) may be provided by the processing unit 237 (with processing support from the module 160, as needed) executing instructions stored on a computer-readable data storage medium, such as the memory 240 shown in FIG. 16.

The eNB 126 may further include a timing and control unit 242 and a core network interface unit 243 as illustrated in FIG. 16. The control unit 242 may monitor operations of the processor 232 and the network interface unit 243, and may provide appropriate timing and control signals to these units. The interface unit 243 may provide a bi-directional interface for the eNB 126 to communicate with its core network (e.g., the core network 129 in the embodiment of FIG. 6) to facilitate administrative and call/data-management functions for mobile subscribers operating in the corresponding carrier network (e.g., the carrier network 124 in FIG. 6) through eNB 126.

Alternative embodiments of the base station 126 may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features and elements. Some or all aspects of the methodology provided herein (related to reduction of scheduling-related signaling overhead) may be implemented in a computer program, software, or firmware incorporated in a computer-readable storage medium (e.g., the memory 222 in FIG. 15 or the memory 240 in FIG. 16) for execution by a general purpose computer or a processor (e.g., the processor 220 in FIG. 15 or the processing unit 237 in FIG. 16). Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs). In certain embodiments, the memory 240 may employ distributed data storage with/without redundancy.

The foregoing describes a system and method for reducing signaling overhead related to scheduling of uplink and downlink radio resources to primarily stationary wireless devices (such as, e.g., sensors or M2M devices that are primarily fixed at a physical location) in a 3GPP cellular network. Because these wireless devices are stationary, time-frequency channel conditions have a much lower variance for such static devices as compared to other mobile devices in the network. As the channel is not significantly varying in time—e.g., due to lack of movement of such fixed terminals/sensors, the (semi)stationary channel can be learned (or estimated) over time with the help of statistical methods and machine learning techniques, and stationary devices can be then instructed to stop reporting uplink and/or downlink channel condition related information to the network until further notice. When performance degradation is noticed by the base station, the scheduler may trigger/instruct the device to resume its channel condition reporting. As a byproduct of this solution, the energy consumed within such stationary terminals/sensors is reduced due to significant reductions in the number of channel measurements, their processing, and reporting. Furthermore, reduced signaling increases system capacity and reduces interference in neighbor cells.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method for reducing signaling overhead related to scheduling of Uplink (UL) and Downlink (DL) radio resources to a wireless device that is in wireless communication with a network entity in a mobile communication network associated with the wireless device, wherein the mobile communication network receives UL and DL scheduling information from the network entity, the method comprising performing the following using the network entity:
   detecting that DL and UL channel conditions between the network entity and the wireless device are stable in time;
   upon detecting that the DL and UL channel conditions between the network entity and the wireless device are stable in time, performing at least one of the following:
      statistically analyzing DL channel condition related information received from the wireless device over a first predetermined time interval to determine future device-specific DL scheduling resources to allocate to the wireless device; and
      statistically analyzing UL channel condition related information received from the wireless device over a second predetermined time interval to determine future device-specific UL scheduling resources to allocate to the wireless device; and
   upon conclusion of statistical analysis, instructing the wireless device to perform at least one of the following:
      stop reporting DL channel condition related information to the network entity until further notice; and
      stop reporting UL channel condition related information to the network entity until further notice;
   wherein statistically analyzing DL channel condition related information includes:
   generating device-specific DL-related stored information over the first predetermined time interval, wherein the device-specific DL-related stored information is generated by storing the following using a unique identity for the wireless device:
      all DL channel condition related information received from the wireless device over the first predetermined time interval; and
      network state related information for a state of the mobile communication network at a time of receipt of the DL channel condition related information over the first predetermined time interval;
   analyzing the device-specific DL-related stored information to determine therefrom future DL scheduling resources for the wireless device in case of absence of further DL channel condition related information from the wireless device; and
   preparing a first indicator that enables the wireless device to stop reporting DL channel condition related information to the network entity; and
   wherein statistically analyzing UL channel condition related information includes:
      estimating UL channel quality for each UL channel condition related information received from the wireless device over the second predetermined time interval;
      generating device-specific UL-related stored information over the second predetermined time interval, wherein the device-specific UL-related stored information is generated by storing the following using the unique identity for the wireless device:
         all UL channel condition related information received from the wireless device over the second predetermined time interval;
         estimations of UL channel quality associated with the UL channel condition related information; and
         network state related information for a state of the mobile communication network at the time of estimations of UL channel quality;
      analyzing the device-specific UL-related stored information to determine therefrom future UL scheduling resources to allocate to the wireless device in case of absence of further UL channel condition related information from the wireless device; and
      preparing a second indicator that enables the wireless device to stop reporting UL channel condition related information to the network entity.

2. The method of claim 1, wherein the network entity is one of the following:

a Radio Base Station (RBS);
a Base Station Controller (BSC);
an evolved Node B (eNodeB); and
a mobile communication node comprising UL and DL schedulers.

3. The method of claim 1, wherein the wireless device is one of the following:
a Machine-to-Machine (M2M) Device;
an M2M Gateway; and
a User Equipment (UE).

4. The method of claim 1, wherein the DL channel condition related information includes at least one of the following:
an estimation of complex channel values per sub-band over a first predetermined number of frequency sub-bands associated with a DL reference signal sent by the network entity and received by the wireless device over a wireless communication channel; and
a distribution of Channel Quality Information (CQI) for the wireless communication channel over a second predetermined number of frequency sub-bands associated with the DL reference signal;
wherein the UL channel condition related information includes a Sounding Reference Signal (SRS).

5. The method of claim 1, wherein instructing the wireless device to stop reporting DL channel condition related information includes sending the first indicator with a first predetermined value to the wireless device, and wherein instructing the wireless device to stop reporting UL channel condition related information includes sending the second indicator with a second predetermined value to the wireless device.

6. The method of claim 5, wherein at least one of the first and the second indicators is one of the following:
a first flag bit in a Downlink Control Information (DCI) message sent to the wireless device via a first Physical Downlink Control Channel (PDCCH); and
a second flag bit in a Radio Resource Control (RRC) message sent to the wireless device via a second PDCCH.

7. The method of claim 5, further comprising performing at least one of the following using the network entity:
instructing the wireless device to resume reporting DL channel condition related information to the network entity; and
instructing the wireless device to resume reporting UL channel condition related information to the network entity.

8. The method of claim 7, wherein instructing the wireless device to resume reporting DL channel condition related information includes sending the first indicator with a third predetermined value to the wireless device, and wherein instructing the wireless device to resume reporting UL channel condition related information includes sending the second indicator with a fourth predetermined value to the wireless device.

9. The method of claim 8, wherein the third predetermined value is opposite of the first predetermined value, and wherein the fourth predetermined value is opposite of the second predetermined value.

10. A method for reducing signaling overhead related to scheduling of Uplink (UL) and Downlink (DL) radio resources to a wireless device that is in wireless communication with a network entity in a mobile communication network associated with the wireless device, wherein the mobile communication network receives UL and DL scheduling information from the network entity, the method comprising performing the following using the network entity:
detecting that DL and UL channel conditions between the network entity and the wireless device are stable in time;
upon detecting that the DL and UL channel conditions between the network entity and the wireless device are stable in time, performing at least one of the following:
statistically analyzing DL channel condition related information received from the wireless device over a first predetermined time interval to determine future device-specific DL scheduling resources to allocate to the wireless device; and
statistically analyzing UL channel condition related information received from the wireless device over a second predetermined time interval to determine future device-specific UL scheduling resources to allocate to the wireless device; and
upon conclusion of statistical analysis, instructing the wireless device to perform at least one of the following:
stop reporting DL channel condition related information to the network entity until further notice; and
stop reporting UL channel condition related information to the network entity until further notice;
wherein at least one of the following applies:
the first predetermined time interval is measured in terms of a time taken to receive a first predetermined number of reports from the wireless device, wherein each report in the first predetermined number of reports contains a report-specific DL channel condition related information; and
the second predetermined time interval is measured in terms of a time taken to receive a second predetermined number of reports from the wireless device, wherein each report in the second predetermined number of reports contains a report-specific UL channel condition related information.

11. A mobile communication node configured to provide a radio interface to a wireless device in a wireless network associated with the wireless device, wherein the mobile communication node comprises:
a transceiver configured to transmit wireless signals to the wireless device and to receive wireless signals from the wireless device;
a scheduler configured to send Uplink (UL) and Downlink (DL) radio resource scheduling information to the wireless device via the transceiver, and receive DL and UL channel condition related information from the wireless device via the transceiver; and
a processor coupled to the transceiver and the scheduler, and configured to detect that DL and UL channel conditions between the mobile communication node and the wireless device are stable in time, and to perform at least one of the following upon detecting that the DL and UL channel conditions between the mobile communication node and the wireless device are stable in time:
statistically analyze DL channel condition related information received by the scheduler from the wireless device over a first predetermined time interval to determine future device-specific DL scheduling resources to allocate to the wireless device; and
statistically analyze UL channel condition related information received by the scheduler from the wireless device over a second predetermined time interval to determine future device-specific UL scheduling resources to allocate to the wireless device;

wherein the processor is further configured to provide the scheduler with results of statistical analysis; and wherein, upon receiving the results of statistical analysis from the processor, the scheduler is operable to send an instruction to the wireless device via the transceiver, wherein the instruction instructs the wireless device to perform at least one of the following:

stop reporting DL channel condition related information to the mobile communication node until further notice; and stop reporting UL channel condition related information to the mobile communication node until further notice;

wherein the mobile communication node further comprises:

a memory coupled to the processor and the scheduler;

wherein the scheduler is configured to store device-specific DL-related information in the memory using a unique identity for the wireless device, wherein the device-specific DL-related information includes:

all DL channel condition related information received from the wireless device over the first predetermined time interval; and network state related information for a state of the wireless network at a time of receipt of the DL channel condition related information over the first predetermined time interval; and wherein the processor is configured to statistically analyze DL channel condition related information by performing the following:

analyzing the device-specific DL-related information stored in the memory to determine therefrom future DL scheduling resources to allocate to the wireless device in case of absence of further DL channel condition related information from the wireless device; and preparing a first command to be sent to the scheduler as part of the results of statistical analysis to enable the scheduler to instruct the wireless device to stop reporting DL channel condition related information to the mobile communication node.

12. The mobile communication node of claim 11, wherein the scheduler is further configured to:

estimate UL channel quality for each UL channel condition related information received from the wireless device over the second predetermined time interval; and store device-specific UL-related information in the memory using the unique identity for the wireless device, wherein the device-specific UL-related information includes:

all UL channel condition related information received from the wireless device over the second predetermined time interval;

estimations of UL channel quality associated with the UL channel condition related information; and network state related information for a state of the wireless network at a time of estimations of UL channel quality; and wherein the processor is further configured to statistically analyze UL channel condition related information by performing the following:

analyzing the device-specific UL-related information stored in the memory to determine therefrom future UL scheduling resources to allocate to the wireless device in case of absence of further UL channel condition related information from the wireless device; and preparing a second command to be sent to the scheduler as part of the results of statistical analysis to enable the scheduler to instruct the wireless device to stop reporting UL channel condition related information to the mobile communication node.

13. The mobile communication node of claim 12, wherein, in response to receiving the first command from the processor, the scheduler is configured to send a first message with a first predetermined value to the wireless device as part of instructing the wireless device to stop reporting DL channel condition related information, and wherein, in response to receiving the second command from the processor, the scheduler is further configured to send a second message with a second predetermined value to the wireless device as part of instructing the wireless device to stop reporting UL channel condition related information.

14. The mobile communication node of claim 11, wherein the mobile communication node is one of the following:

a Radio Base Station (RBS);

a Base Station Controller (BSC); and an evolved Node B (eNodeB).

15. A method for reducing signaling overhead related to scheduling of Uplink (UL) and Downlink (DL) radio resources to a wireless device that is in wireless communication with a network entity in a mobile communication network associated with the wireless device, the method comprises performing the following using the wireless device:

reporting at least one of the following to the network entity:

DL channel condition related information indicating that DL channel conditions between the network entity and the wireless device are stable in time; and UL channel condition related information indicating that UL channel conditions between the wireless device and the network entity are stable in time;

monitoring a DL control channel that provides UL and DL radio resource scheduling information from the network entity;

identifying whether the DL control channel includes one of the following device-specific indicators for the wireless device:

a first indicator with a first predetermined value; and a second indicator with a second predetermined value;

discontinuing the reporting of DL channel condition related information to the network entity when the wireless device receives the first indicator with the first predetermined value from the DL control channel; and discontinuing the reporting of UL channel condition related information to the network entity when the wireless device receives the second indicator with the second predetermined value from the DL control channel;

wherein discontinuing the reporting of DL channel condition related information includes continuing to use the same DL scheduling grant as that was used by the wireless device immediately prior to the receipt of the first indicator; and wherein discontinuing the reporting of UL channel condition related information includes continuing to use the same UL scheduling grant as that was used by the wireless device immediately prior to the receipt of the second indicator.

16. The method of claim 15, further comprising performing the following using the wireless device:
- further monitoring the DL control channel to identify whether the DL control channel includes one of the following device-specific indicators for the wireless device:
  - the first indicator with a third predetermined value; and
  - the second indicator with a fourth predetermined value;
- resuming the reporting of DL channel condition related information to the network entity when the wireless device receives the first indicator with the third predetermined value from the DL control channel; and
- resuming the reporting of UL channel condition related information to the network entity when the wireless device receives the second indicator with the fourth predetermined value from the DL control channel.

17. A wireless device that is in wireless communication with a network entity in a mobile communication network associated with the wireless device, wherein the wireless device comprises:
- a transceiver configured to transmit wireless signals to and receive wireless signals from the network entity; and
- a processor coupled to the transceiver and to a memory that stores computer program instructions, wherein when the processor executes the computer program instructions, the processor is caused to perform the following:
  - report at least one of the following to the network entity using the transceiver:
    - Downlink (DL) channel condition related information indicating that DL channel conditions between the network entity and the wireless device are stable in time; and
    - Uplink (UL) channel condition related information indicating that UL channel conditions between the wireless device and the network entity are stable in time;
  - monitor, using the transceiver, a DL control channel that provides UL and DL radio resource scheduling information from the network entity;
  - identify whether the DL control channel includes one of the following device-specific indicators for the wireless device:
    - a first indicator with a first predetermined value; and
    - a second indicator with a second predetermined value;
  - discontinue the reporting of DL channel condition related information to the network entity when the processor receives, via the transceiver, the first indicator with the first predetermined value from the DL control channel;
  - discontinue the reporting of UL channel condition related information to the network entity when the processor receives, via the transceiver, the second indicator with the second predetermined value from the DL control channel;
  - continue to use a DL scheduling grant that was used by the wireless device immediately prior to the receipt of the first indicator; and
  - continue to use a UL scheduling grant that was used by the wireless device immediately prior to the receipt of the second indicator.

18. The wireless device of claim 17, wherein the wireless device is one of the following:
- a Machine-to-Machine (M2M) Device;
- an M2M Gateway; and
- a User Equipment (UE).

19. The wireless device of claim 17, wherein the wireless device is stationary, thereby causing the DL and UL channel conditions between the wireless device and the network entity to be stable in time.

20. A system for reducing signaling overhead related to scheduling of Uplink (UL) and Downlink (DL) radio resources in a mobile communication network, the system comprising:
- a wireless device that is in wireless communication with a mobile communication node in the mobile communication network, wherein the wireless device includes a transceiver configured to transmit wireless signals to and receive wireless signals from the mobile communication node, and a processor coupled to the transceiver and to a memory that stores computer program instructions, wherein when the processor executes the computer program instructions, the processor is caused to perform the following:
  - utilize the transceiver to report at least one of the following to the mobile communication node:
    - DL channel condition related information indicating that DL channel conditions between the mobile communication node and the wireless device are stable in time; and
    - UL channel condition related information indicating that UL channel conditions between the wireless device and the mobile communication node are stable in time;
  - utilize the transceiver to monitor a DL control channel that provides UL and DL radio resource scheduling information from the mobile communication node;
  - identify whether the DL control channel includes one of the following device-specific indicators for the wireless device:
    - a first indicator with a first predetermined value; and
    - a second indicator with a second predetermined value;
  - discontinue the reporting of DL channel condition related information to the mobile communication node when the transceiver receives the first indicator with the first predetermined value from the DL control channel;
  - discontinue the reporting of UL channel condition related information to the mobile communication node when the transceiver receives the second indicator with the second predetermined value from the DL control channel;
  - continue to use a DL scheduling grant that was used by the wireless device immediately prior to the receipt of the first indicator; and
  - continue to use a UL scheduling grant that was used by the wireless device immediately prior to the receipt of the second indicator; and
- the mobile communication node for providing a radio interface to the wireless device in the mobile communication network, wherein the mobile communication node includes a node transceiver configured to transmit wireless signals to and receive wireless signals from the wireless device, and a node processor coupled to the transceiver and to a node memory that stores computer program instructions, wherein when the node processor executes the computer program instructions, the node processor is caused to perform the following:
  - utilize the node transceiver to send DL and UL radio resource scheduling information to the wireless device and receive DL and UL channel condition related information from the wireless device;

detect that DL and UL channel conditions between the mobile communication node and the wireless device are stable in time;

upon detecting that the DL and UL channel conditions between the mobile communication node and the wireless device are stable in time, perform at least one of the following:

statistically analyze DL channel condition related information received from the wireless device over a first predetermined time interval to determine future device-specific DL scheduling resources to allocate to the wireless device; and statistically analyze UL channel condition related information received from the wireless device over a second predetermined time interval to determine future device-specific UL scheduling resources to allocate to the wireless device; and upon conclusion of statistical analysis, utilize the node transceiver to send the DL control channel with the first indicator or the second indicator to the wireless device, thereby instructing the wireless device to perform one of the following:

stop reporting DL channel condition related information to the mobile communication node until further notice when the DL control channel contains the first indicator; and stop reporting UL channel condition related information to the mobile communication node until further notice when the DL control channel contains the second indicator.

21. A mobile communication node configured to provide a radio interface to a wireless device in a wireless network associated with the wireless device, wherein the mobile communication node includes:

a node transceiver configured to transmit wireless signals to and receive wireless signals from the wireless device; and a node processor coupled to the transceiver and to a memory that stores computer program instructions, wherein when the node processor executes the computer program instructions, the node processor is caused to perform the following:

utilize the node transceiver to receive Downlink (DL) and Uplink (UL) channel condition related information from the wireless device indicating that DL and UL channel conditions between the mobile communication node and the wireless device are stable in time;

perform at least one of the following in response to receiving the information indicating that the DL and UL channel conditions between the mobile communication node and the wireless device are stable in time:

statistically analyze DL channel condition related information received from the wireless device over a first predetermined time interval to determine future device-specific DL scheduling resources to allocate to the wireless device; and statistically analyze UL channel condition related information received from the wireless device over a second predetermined time interval to determine future device-specific UL scheduling resources to allocate to the wireless device;

upon conclusion of statistical analysis, utilize the node transceiver to send a Downlink Control Information (DCI) message to the wireless device instructing the wireless device to perform one of the following:

stop reporting DL channel condition related information to the mobile communication node until further notice; and stop reporting UL channel condition related information to the mobile communication node until further notice;

wherein at least one of the following applies:

the first predetermined time interval is measured in terms of a time taken to receive a first predetermined number of reports from the wireless device, wherein each report in the first predetermined number of reports contains a report-specific DL channel condition related information; and the second predetermined time interval is measured in terms of a time taken to receive a second predetermined number of reports from the wireless device, wherein each report in the second predetermined number of reports contains a report-specific UL channel condition related information.

\* \* \* \* \*